(12) United States Patent
Jorgenson et al.

(10) Patent No.: US 12,375,208 B2
(45) Date of Patent: Jul. 29, 2025

(54) COOPERATIVE TRANSMISSION CONTINUOUS TRANSMISSION ENHANCEMENT

(71) Applicant: Rockwell Collins, Inc., Cedar Rapids, IA (US)

(72) Inventors: Mark B. Jorgenson, Kanata (CA); Robert W. Johnson, Ottawa (CA)

(73) Assignee: Rockwell Collins, Inc., Cedar Rapids, IA (US)

( * ) Notice: Subject to any disclaimer, the term of this patent is extended or adjusted under 35 U.S.C. 154(b) by 334 days.

(21) Appl. No.: 17/844,382

(22) Filed: Jun. 20, 2022

(65) Prior Publication Data

US 2023/0412306 A1    Dec. 21, 2023

(51) Int. Cl.
*H04L 1/08*   (2006.01)
*H04L 1/1812* (2023.01)
*H04L 1/1829* (2023.01)

(52) U.S. Cl.
CPC .............. *H04L 1/08* (2013.01); *H04L 1/1812* (2013.01); *H04L 1/1845* (2013.01); *H04L 1/1848* (2013.01)

(58) Field of Classification Search
CPC ....... H04L 1/08; H04L 1/1812; H04L 1/1848; H04L 2001/0097; H04L 1/1845
See application file for complete search history.

(56) References Cited

U.S. PATENT DOCUMENTS

| | | |
|---|---|---|
| 4,639,937 A | 1/1987 | McRae et al. |
| 10,085,258 B2 | 9/2018 | Yu et al. |
| 11,190,862 B1 | 11/2021 | Jorgenson et al. |
| 11,197,324 B2 | 12/2021 | Abedini et al. |
| 11,239,986 B2 | 2/2022 | Fehrenbach et al. |
| 2008/0043711 A1* | 2/2008 | Hart ............. H04J 3/0632 370/348 |
| 2010/0190433 A1 | 7/2010 | Zhang et al. |

(Continued)

FOREIGN PATENT DOCUMENTS

| | | |
|---|---|---|
| EP | 2119086 A1 | 11/2009 |
| EP | 3876455 A1 | 9/2021 |
| WO | 2018077395 A1 | 5/2018 |

OTHER PUBLICATIONS

Extended European Search Report dated Aug. 11, 2023; European Application No. 23179550.1.

*Primary Examiner* — Pao Sinkantarakorn
*Assistant Examiner* — Kabir U Jahangir
(74) *Attorney, Agent, or Firm* — Suiter Swantz IP

(57) ABSTRACT

A system and method for increasing the efficiency of an avalanche relay scheme is disclosed. The system and method include a plurality of networked nodes communicating in a slot and subslot scheme, with transmissions of a first signal from a first subslot relayed in subsequent subslots. The method and system include transmitting an initial transmission that includes the first signal, and then continuing to transmit at least one of a retransmitted portion of the first signal, or a transmission of an algorithmically related signal based on the first signal. The receiving node combines the first signal with the retransmitted portion of the first signal or the algorithmically related signal to determine if the initial transmission is valid. Upon a determination that the initial transmission is valid, the relay node retransmits the initial transmission in a future subslot.

20 Claims, 13 Drawing Sheets

(56) References Cited

U.S. PATENT DOCUMENTS

| | | | |
|---|---|---|---|
| 2011/0167326 A1* | 7/2011 | Kuri | H04B 7/155 |
| | | | 714/E11.032 |
| 2012/0008545 A1* | 1/2012 | Zhang | H04L 1/1829 |
| | | | 370/315 |
| 2019/0356412 A1 | 11/2019 | Pitigoi-Aron et al. | |
| 2021/0014939 A1 | 1/2021 | Verzun et al. | |
| 2021/0282135 A1 | 9/2021 | Woods et al. | |
| 2022/0007402 A1 | 1/2022 | Nam et al. | |
| 2023/0353290 A1* | 11/2023 | Back | H04L 1/189 |
| 2024/0292348 A1* | 8/2024 | Luetzenkirchen | H04L 43/0817 |

* cited by examiner

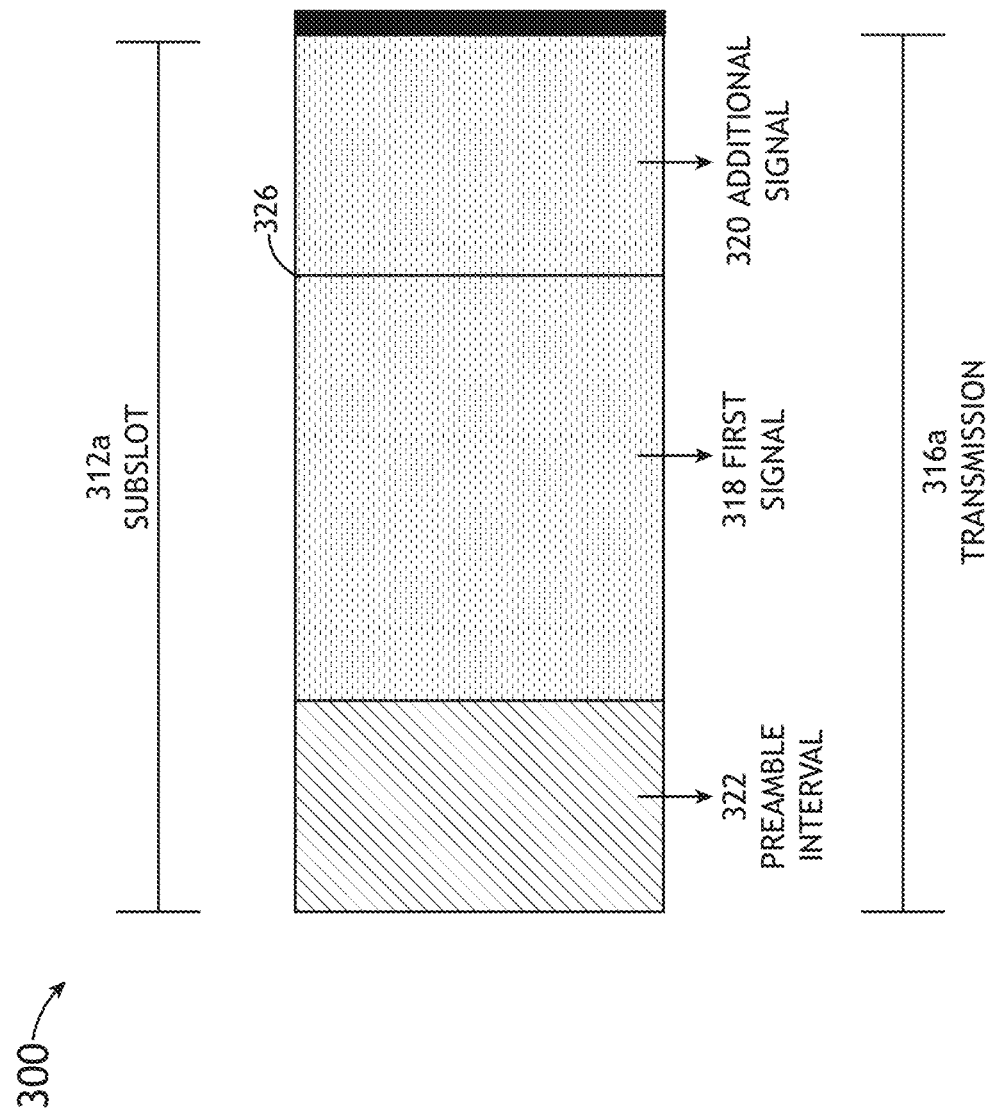

COOPERATIVE TRANSMISSION CONTINUOUS TRANSMISSION ENHANCEMENT

BACKGROUND

Many network relay systems rely on synchronized time-based schemes that permit the orderly transmission, reception, and retransmission of messages. These schemes often rely on non-data transmitting time-periods that add considerable overhead to each transmission and retransmission. These synchronized time-based schemes are also susceptible to noise. Therefore, it is desirable to provide a system and method that avoids the shortcomings of conventional approaches.

SUMMARY

A method is disclosed. In one or more embodiments, the method includes establishing a multiple access communication scheme among a plurality of network nodes, wherein the multiple access communication scheme utilizes subslots. In one or more embodiments, the method further includes transmitting an initial transmission from an originating node or a retransmitting node in a first subslot to at least one relay node, wherein the initial transmission includes a first signal that is sufficient to convey a message. In some embodiments, the method further continuing to transmit, by the originating node to the at least one relay node, additional signal including at least one of a retransmitted portion of the first signal, a transmission of an algorithmically related signal based on the first signal, or a transmission of the algorithmically related signal based on the message, within the first subslot or a beginning of a subsequent subslot, wherein the additional signal is transmitted by the originating node or retransmitting node past a decision point is used by the at least one relay node to determine whether to transmit a retransmission of the first signal to convey the message in the subsequent subslot or a next subsequent subslot. In one or more embodiments, the method further includes determining by the at least one relay node that it has received the message. In one or more embodiments, the method further includes preparing the retransmission of the first signal, the algorithmically related signal based on the first signal, or the algorithmically related signal conveying the message by the at least one relay node within a future subslot based upon a determination at the decision point that the at least one relay has received the message, wherein preparing the retransmission includes determining the first signal, the algorithmically related signal based on the first signal, or the algorithmically related signal based on the message, that is coordinated in content between the originating node and the relay nodes transmitting the message. In one or more embodiments, the method further includes transmitting the retransmission of the first signal, the algorithmically related signal based on the first signal, or the algorithmically related signal based on the message, in the future subslot, wherein the retransmission is coordinated in time between all the relay nodes transmitting the message.

In some embodiments of the method, transmitting the first signal with the additional signal increases a likelihood of correct reception of the first signal by another node in the subsequent subslot.

In some embodiments of the method, the algorithmically related signal based on the first signal or the algorithmically related signal based on the message, includes error correcting code.

In some embodiments of the method, the retransmitted portion of the first signal is transmitted into the first subslot.

In some embodiments of the method, the retransmitted portion of the first signal is transmitted into the beginning of the subsequent subslot.

In some embodiments of the method, the wherein the algorithmically related signal based on the first signal or the algorithmically related signal based on the message, is transmitted into the first subslot.

In some embodiments of the method, the algorithmically related signal is transmitted into the subsequent subslot.

In some embodiments of the method, a section of the first subslot receiving the retransmitted portion of the first signal, or the algorithmically related signal, corresponds to a guard interval.

In some embodiments, a section of the first subslot receiving the retransmitted portion of the first signal, the algorithmically related signal based on the first signal, or the algorithmically related signal based on the message, corresponds to a guard interval.

In some embodiments, wherein a section of the subsequent subslot receiving the retransmitted portion of the first signal, the algorithmically related signal based on the first signal, or the algorithmically related signal based on the message, corresponds to a preamble interval.

In some embodiments, the plurality of network nodes is configured to perform an avalanche relay protocol.

In some embodiments, the method further includes partitioning an available communication resource into slots, and the subslots In some embodiments, the method further includes preparing the retransmission of the first signal by the at least one relay node within the future subslot, based on the determination at the decision point that the at least one relay has not received the message, wherein the at least one relay node does not retransmit the retransmission of the first signal in the subsequent subslot, wherein the at least one relay node retransmits the first signal conveying the message as the retransmission in the first subslot after a successful reception of the message prior to the decision point, wherein the retransmission of the first signal is based on data transmitted past the decision point by the originating node and/or retransmitting nodes. In some embodiments, preparing the retransmission includes continuing to receive additional signal until a next decision point. In some embodiments, preparing the retransmission further includes combining the first signal with at least one of the retransmitted portion of the first signal, the algorithmically related signal based on the first signal, or the algorithmically related signal based on the message. In some embodiments, preparing the retransmission further includes detecting if the message conveyed by the first signal has been correctly received based on a combination of the first signal and the retransmitted portion of the first signal, the algorithmically related signal based on the first signal, or the algorithmically related signal based on the message in prior subslots and up to the decision point. In some embodiments, preparing the retransmission further includes generating the retransmission of the first signal conveying the message by the at least one relay node within the future subslot based upon the determination at the next decision point that the at least one relay has received the message, wherein generating the retransmission includes determining the first signal, the algorithmically related signal based on the first signal, or the algorithmically related signal based on the message, that is coordinated in content between the originating nodes and the relay nodes transmitting the message. In some embodiments, the method further includes transmitting the retransmission of the first signal, the algorithmically related signal based on the first signal, or the algorithmically related signal based on the message, in the future subslot, wherein the retransmission is coordinated in time between all relays transmitting the message.

In some embodiments of the method, the method further includes preparing the retransmission further includes continuing to receive additional signal until one or more subsequent decisions points after the next decision point.

In some embodiments of the method, the additional signal is transmitted by all transmitting nodes continuing to transmit during a preamble interval during which at least one node transmits a preamble In some embodiments of the method, the retransmission of the first signal, the algorithmically related signal based on the first signal, or the algorithmically related signal based on the message further includes additional data that is transmitted past the decision point.

A system is disclosed. In one or more embodiments, the system includes a plurality of network nodes. In one or more embodiments of the system, two or more network nodes includes an antenna, a transmitter, and a receiver. In one or more embodiments of the system, the two or more network nodes further include one or more processors. In one or more embodiments of the system, the two or more network nodes further include a memory with instructions stored upon that are executed by the one or more processors. In one or more embodiments, the instructions include establishing a multiple access communication scheme among the plurality of network nodes, wherein the multiple access communication scheme utilizes subslots. In one or more embodiments, the instructions further include transmitting an initial transmission from an originating node or a retransmitting node in a first subslot to at least one relay node, wherein the initial transmission comprises a first signal that is sufficient to convey a message. In one or more embodiments, the instructions further include continuing to transmit to transmit, by the originating node to the at least one relay node, additional signal comprising at least one of a retransmitted portion of the first signal, a transmission of an algorithmically related signal based on the first signal or a transmission of the algorithmically related signal based on the message, within the first subslot or a beginning of a subsequent subslot, wherein the additional signal is transmitted by the originating node or retransmitting node past a decision point used by the at least one relay node to determine whether to transmit a retransmission of the first signal to convey the message in the subsequent subslot. In one or more embodiments, the system further includes determining by the at least one relay node that the at least one relay node has received the message. In one or more embodiments, the system further includes the retransmission of the first signal conveying the message by the at least one relay node within a future subslot based upon a determination at the decision point that the at least one relay has received the message, wherein preparing the retransmission comprises determining the first signal, the algorithmically related signal based on the first signal, or the algorithmically related signal based on the message, that is coordinated in content between all originating nodes and all relay nodes transmitting the message. In one or more embodiments, the instructions further include transmitting the retransmission of the first signal, the algorithmically related signal based on the first signal, or the algorithmically related signal based on the message, in the future subslot, wherein the retransmission is coordinated in time between all relays transmitting the message.

In some embodiments of the system, a combination of the first signal with the retransmitted portion of the first signal, the algorithmically related signal based on the first signal, or the algorithmically related first signal based on the message increases a likelihood of a reception of the first signal by another node.

In some embodiments of the system, the instructions further cause the one or more processor to prepare the retransmission of the first signal by the at least one relay node within the future subslot, based on the determination at the decision point that the at least one relay node has not received the message, wherein the at least one relay node does not retransmit the retransmission of the first signal in the subsequent subslot, wherein the at least one relay node retransmits the first signal conveying the message as the retransmission in the first subslot after a successful reception of the message prior to the decision point, wherein the retransmission is based on data transmitted past the decision point by the originating node and/or retransmitting nodes. In some embodiments, preparing the retransmission comprises continuing to receive additional signal until a next decision point. In some embodiments, preparing the retransmission further comprises combining the first signal with at least one of the retransmitted portion of the first signal, the algorithmically related signal based on the first signal, or the algorithmically related signal based on the message. In some embodiments, preparing the retransmission further comprises detecting if the message conveyed by the first signal has been correctly received based on a combination of the first signal and the retransmitted portion of the first signal, the algorithmically related signal based on the first signal, or the algorithmically related signal based on the message, in prior subslots and up to the decision point. In some embodiments, preparing the retransmission further comprises generating the retransmission of the first signal conveying the message by the at least one relay node within the future subslot based upon the determination at the next decision point that the at least one relay has received the message, wherein generating the retransmission comprises determining the first signal, the algorithmically related signal based on the first signal, or the algorithmically related signal based on the message, that is coordinated in content between all originating nodes and all relay nodes transmitting the message. In some embodiments, the instructions further cause the one or more processor to transmit the retransmission of the first signal, the algorithmically related signal based on the first signal, or the algorithmically related signal based on the message, in the future subslot, wherein the retransmission is coordinated in time between all relays transmitting the message.

Another method is disclosed. In one or more embodiments, the method includes establishing a multiple access communication scheme among a plurality of network nodes, wherein the multiple access communication scheme utilizes subslots. In one or more embodiments, the method further includes transmitting an initial transmission from an originating node or a retransmitting node in a first subslot to at least one relay node, wherein the initial transmission comprises a first signal that is sufficient to convey a message. In one or more embodiments, the method further includes continuing to transmit, by the originating node to the at least one relay node, additional signal comprising at least one of a retransmitted portion of the first signal, a transmission of an algorithmically related signal based on the first signal, or the algorithmically related signal based on the message, within the first subslot or a beginning of a subsequent subslot, wherein the additional signal is transmitted by the originating node or retransmitting node past a decision point used by the at least one relay node to determine whether to transmit a retransmission of the first signal to convey the message in the subsequent subslot. In one or more embodiments, the method further includes determining by the at least one relay node that the at least one relay node has received the message. In one or more embodiments, the method further includes preparing the retransmission of the first signal by the at least one relay node within a future subslot, based on a determination at the decision point that the at least one relay has not received the message, wherein the at least one relay node does not retransmit the retransmission of the first signal in the subsequent subslot, wherein the at least one relay node retransmits the first signal conveying the message as a retransmission in the first subslot after a successful reception of the message prior to the decision point, wherein the retransmission of the first signal is based on data transmitted past the decision point by the originating node and/or retransmitting nodes. In one or more embodiments, preparing the retransmission includes continuing to receive additional signal until a next decision point. In one or more embodiments, preparing the retransmission further includes combining the first signal with at least one of the retransmitted portion of the first signal, the algorithmically related signal based on the first signal, or the algorithmically related signal based on the message. In one or more embodiments, preparing the retransmission further includes detecting if the message conveyed by the first signal has been correctly received based on a combination of the first signal and the retransmitted portion of the first signal, the algorithmically related signal based on the first signal, or the algorithmically related signal based on the message, in prior subslots and up to the decision point. In one or more embodiments, preparing the retransmission further includes generating a retransmission of the first signal conveying the message by the at least one relay node within the future subslot based upon the determination at the next decision point that the at least one relay has received the message, wherein generating the retransmission of the first signal comprises determining the first signal, the algorithmically related signal based on the first signal, or the algorithmically related signal based on the message, that is coordinated in content between the originating nodes and relay nodes transmitting the message. In one or more embodiments, the method further includes transmitting the retransmission of the first signal, the algorithmically related signal based on the first signal, of the algorithmically related signal based on the message, in the future subslot, wherein the retransmission is coordinated in time between all relays transmitting the message.

In some embodiments of the method, nodes transmitting in the first subslot transmits additional signal in a preamble interval in the subsequent subslot, wherein at least one node that does not transmit in the subsequent subslot transmits a preamble in a preamble interval of a next subslot after the subsequent subslot and retransmits the first signal in the next subslot after the subsequent subslot.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 3C is a diagram illustrating the organization of a transmission in relation to a subslot, with the transmission extending to the end of the subslot, in accordance with one or more embodiments of the disclosure.

DETAILED DESCRIPTION

Figure 1:
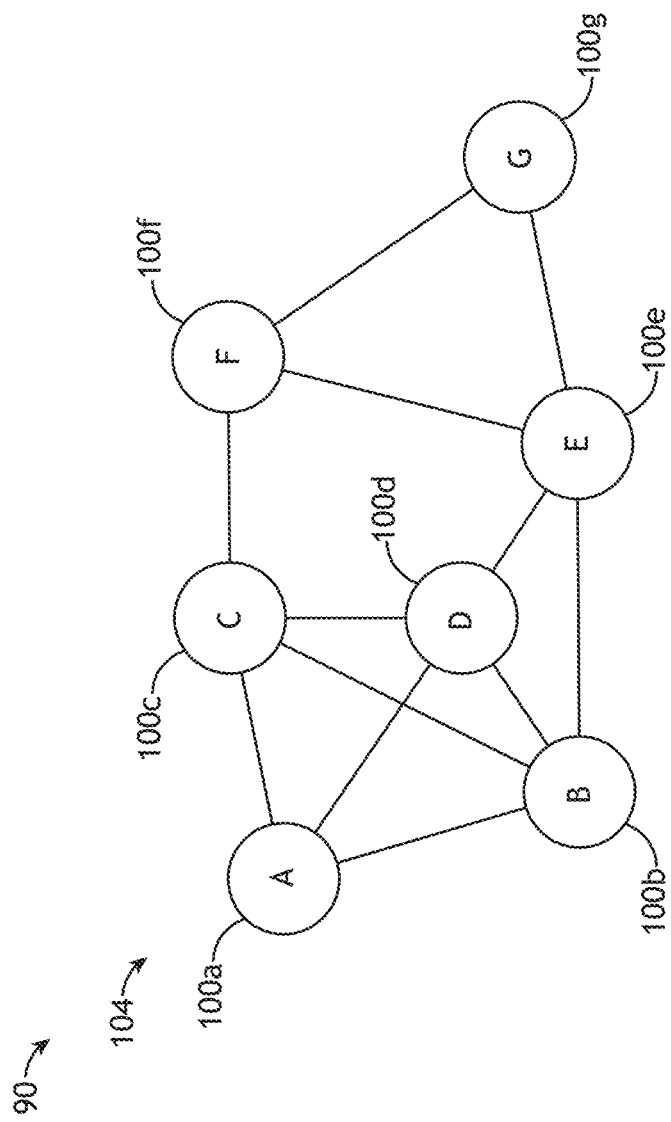
FIG. 1 is a diagram illustrating a system that includes multiple nodes of a network, in accordance with one or more embodiments of the disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

A system and method for performing relaying transmissions is disclosed. The system and method utilize a time-diverse, multiple access relay scheme (e.g., a TDMA method using slots, with one or more slots containing subslots), wherein an initial transmission, which includes a first signal conveying a message, is transmitted in a first subslot (e.g., of a first slot) and received by a relay node, which retransmits the first signal, or an algorithmically related signal based on the first signal (e.g., conveying the same message as the first signal and/or including error correcting code) in a subsequent subslot. Each transmission may be received by several relay nodes and subsequently retransmitted in later subslots, enabling all nodes to receive the first signal. A second signal conveying a second message may then be transmitted in a second, or future, slot.

The first signal, or algorithmically related signal based on the first signal, is sufficient to convey a message from one node to another. In that sense, the message may be conveyed via an algorithmically related signal that is based on the message. Additional signals are also transmitted that may be combined with the first signal and/or algorithmically related signal based on the first signal to increase the probability of reception of the message. The additional signals may include signals that convey the message on its own, or may include signals that augment elements of the first signal and/or algorithmically related signal based on the first signal.

In some embodiments, the system and method utilize an avalanche relay protocol, as described in U.S. Pat. No. 4,639,937, entitled "HF avalanche relay communication technique" filed by McRae on Dec. 7, 1983, which is incorporated by reference in its entirety. In particular, the system and method of the current disclosure describe nodes that, having transmitted a first signal within a subslot, may continue to transmit data, such as a portion of already-transmitted first signal, or the algorithmically related signal, which may include error correcting code corresponding to the already-transmitted transmission, within the same subslot, or the beginning of the subsequent subslot. At a specific point in time, processors within nodes receiving the transmission make a decision on whether to be silent or retransmit the message. This decision is based on error detection codes ((e.g., CRC) or other methods which are used to indicate whether the data that the node has detected has been correctly received.

The receiving node may then prepare a retransmission, and transmit the retransmission in a subsequent, or future, subslot. In contrast to traditional subslot-comprising (e.g., avalanche) relay systems which utilize a guard interval within each subslot to prevent interference between previous and subsequent transmissions and allow time for receivers to detect the first signal in time to decide whether to retransmit the first signal or an algorithmically related signal in the transmission interval of the following subslot, and a preamble for synchronization data, the current system and method reduces the number of guard intervals and/or preambles, within each slot, decreasing transmit inactive time and decreasing the probability of a faulty reception by increasing the proportion of time and therefor signal energy devoted to the information bits.

FIG. 1 is a diagram illustrating a system 90 that includes multiple nodes 100a-g (e.g., network nodes) of a network 104, in accordance with one or more embodiments of the disclosure. The network 104 may be configured as any type of mobile or non-mobile network, any type of wireless or wireline network, and any type of centralized or decentralized (e.g., ad hoc) network. For example, the network 104 may be configured as a wireless mobile ad hoc network (MANET). The network 104 may be configured with any type of topography including but not limited to mesh, star, ring, line, tree, bus, and fully connected topologies. For example, the network 104 may be configured as a MANET with a mesh topology.

The lines connecting each node 100a-g represent lines of communication that are capable between each node, where each node 100a-g can receive and transmit data with at least one other node 100 a-g. This arrangement allows all nodes 100a-g to eventually receive the same data. For example, in an avalanche relay scheme, each node 100a-g is capable of receiving data conveying a message within a subslot of a TMDA slot (e.g., the first signal) and transmitting the same message in the next available subslot, with all nodes 100a-g receiving the message by the end of the slot (e.g., resulting in a fully connected topology).

Figure 2:
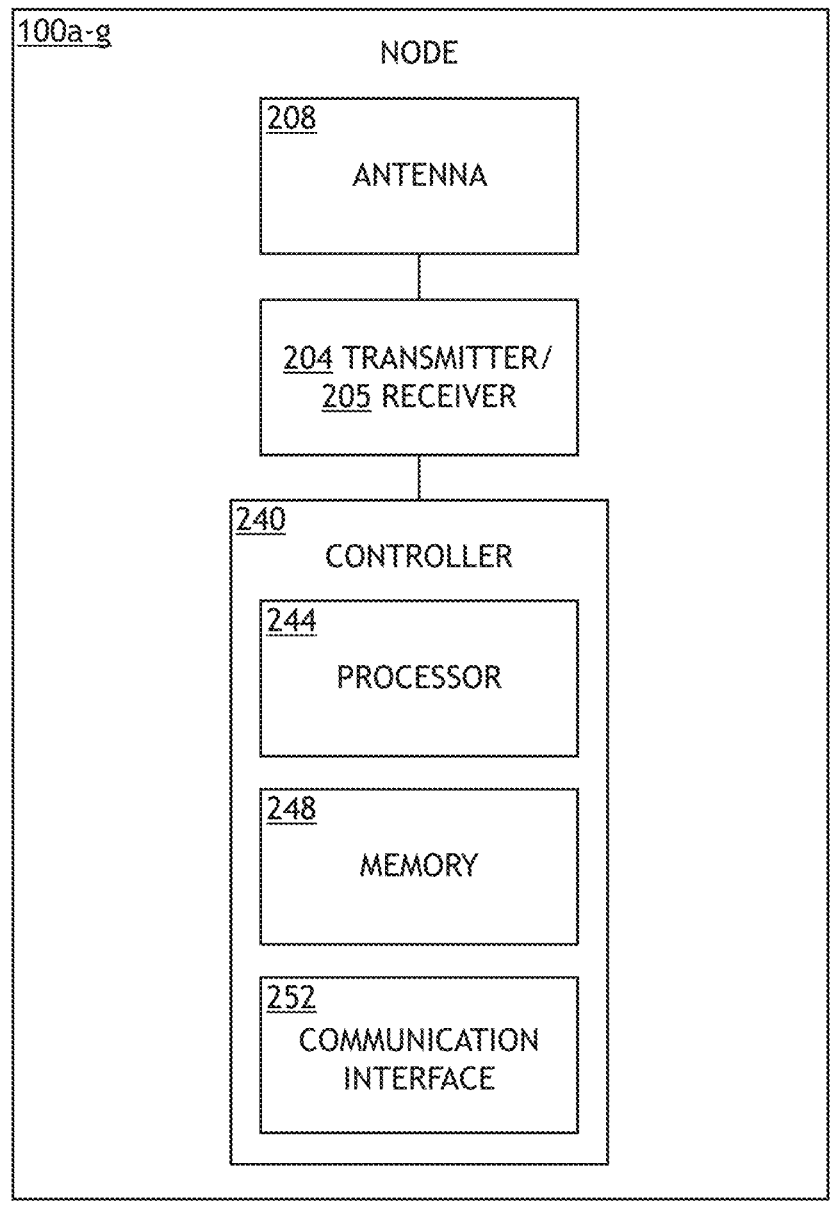
FIG. 2 is a block diagram of a node, in accordance with one or more embodiments of the disclosure.

The network 104 includes at least one node 100a-g configured to transmit a first signal and at least one node 100 a-g configured to relay the first signal. A block diagram of a node 100 a-g is shown in FIG. 2, in accordance with one or more embodiments of the disclosure. One or more nodes 100a-g of the network 104 may contain a transmitter 204, a receiver 205 (e.g., or a transceiver) and an antenna 208. The transmitter 204, receiver 205 and the antenna 208 may be configured to send and receive a diversity signal. For example, the transmitter 204 and/or receiver 205 may be configured to perform time-division multiple access (TDMA) based communication. One or more nodes 100a-g may also be configured to utilize spread-spectrum/frequency hopping techniques, and may be configured to operate under other channel access methods including but not limited to frequency-division multiple access (FDMA), code-division multiple access (CDMA), spread spectrum multiple access, space-division multiple access, power-division multiple access (PDMA), packet mode methods, and the like.

The node 100a-g may include a controller 240 configured to provide processing functionality for the node 100a-g. The controller 240 comprises one or more processors 244, a memory 248, and a computer interface 252. The one or more processors 244 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors 244 may include any device configured to execute algorithms and/or instructions (e.g., program instructions stored in memory 248). In one embodiment, the one or more processors 244 may be embodied as a desktop computer, a flight computer, mainframe computer system, workstation, image computer, parallel processor, networked computer, or any other computer system configured to execute a program configured to operate the node 100a-g, as described throughout the present disclosure. Moreover, different subsystems of the node 100a-g may include a processor or logic elements suitable for carrying out at least a portion of the steps described in the present disclosure. Therefore, the above description should not be interpreted as a limitation on the embodiments of the present disclosure but merely as an illustration. In some embodiments, the node 100a-g is configured to detect signal quality and/or alter a transmission profile of the communication scheme based on signal quality. Signal quality may include an ability of the node 100a-g to transmit/receive a signal and may include the environment for signal transmission. For example, the node 100a-g may be configured to alter the transformation profile of the communication scheme due to interference caused by a lightning storm. Signal quality may also be used in determining whether correct reception has been made by a node 100a-g The memory 248 can be an example of tangible, computer-readable storage medium that provides storage functionality to store various data and/or program code associated with operation of the controller 240 and/or other components of the node 100a-g, such as software programs and/or code segments, or other data to instruct the controller 240 and/or other components to perform the functionality described herein. Thus, the memory 248 can store data, such as a program of instructions for operating the node 100a-g or other components. It should be noted that while a single memory 248 is described, a wide variety of types and combinations of memory 248 (e.g., tangible, non-transitory memory) can be employed. The memory 248 can be integral with the controller, can comprise stand-alone memory, or can be a combination of both. Some examples of the memory 248 can include removable and non-removable memory components, such as a programmable logic device, random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 252 can be operatively configured to communicate with components of the controller 240 and other components of the node 100a-g. For example, the communication interface 252 can be configured to retrieve data from the controller 240 or other components, transmit data for storage in the memory 248, retrieve data from storage in the memory 248, and so forth. The communication interface 252 can also be communicatively coupled with controller 240 and/or system elements to facilitate data transfer between system components.

The network 104 may be configured to operate in a TDMA scheme 300, as illustrated in FIGS. 3A-5B, in accordance with one or more embodiments of the disclosure. The TDMA scheme 300 may be synchronized, with multiple nodes transmitting within an available communication resource (e.g., a time period). For example, the TDMA scheme 300 may include one or more slots 308 partitioned into two or more subslots 312a-c. Messages, or portions of messages, may be transmitted over the slots 308 and subslots 312a-c in a time orderly fashion, with the messaging repeated (transmissions 316 a-c) within the different subslots 312a-c. Repeating the transmission within a slot 308 creates a time-diverse signal that may increase the ability of the transmission 316 a-c to be correctly received. Retransmissions of a first-signal or an algorithmically related signal make this space and time diverse. For example, a transmission may be transmitted by a node 100a in a first subslot 312a, then received by another node 100b and retransmitted in a subsequent subslot 312b. The transmission and retransmission of a signals within subslots 312a-b of a single slot 308 is a hallmark of an avalanche relay, which is disclosed in U.S. Pat. No. 4,639,937, entitled "HF avalanche relay communication technique" filed by McRae. It should be understood that the TDMA scheme 300 does not necessarily have rigid slots 308. For example, an asynchronous initial transmission can form a first subslot 312 of a slot 308 with subsequent retransmissions timed relative to received transmissions in previous subslots 312. In some embodiments, the slot can appear asynchronously (e.g., can appear at any time) and is not required to be embedded in a rigid TDMA structure.

Figure 3A:
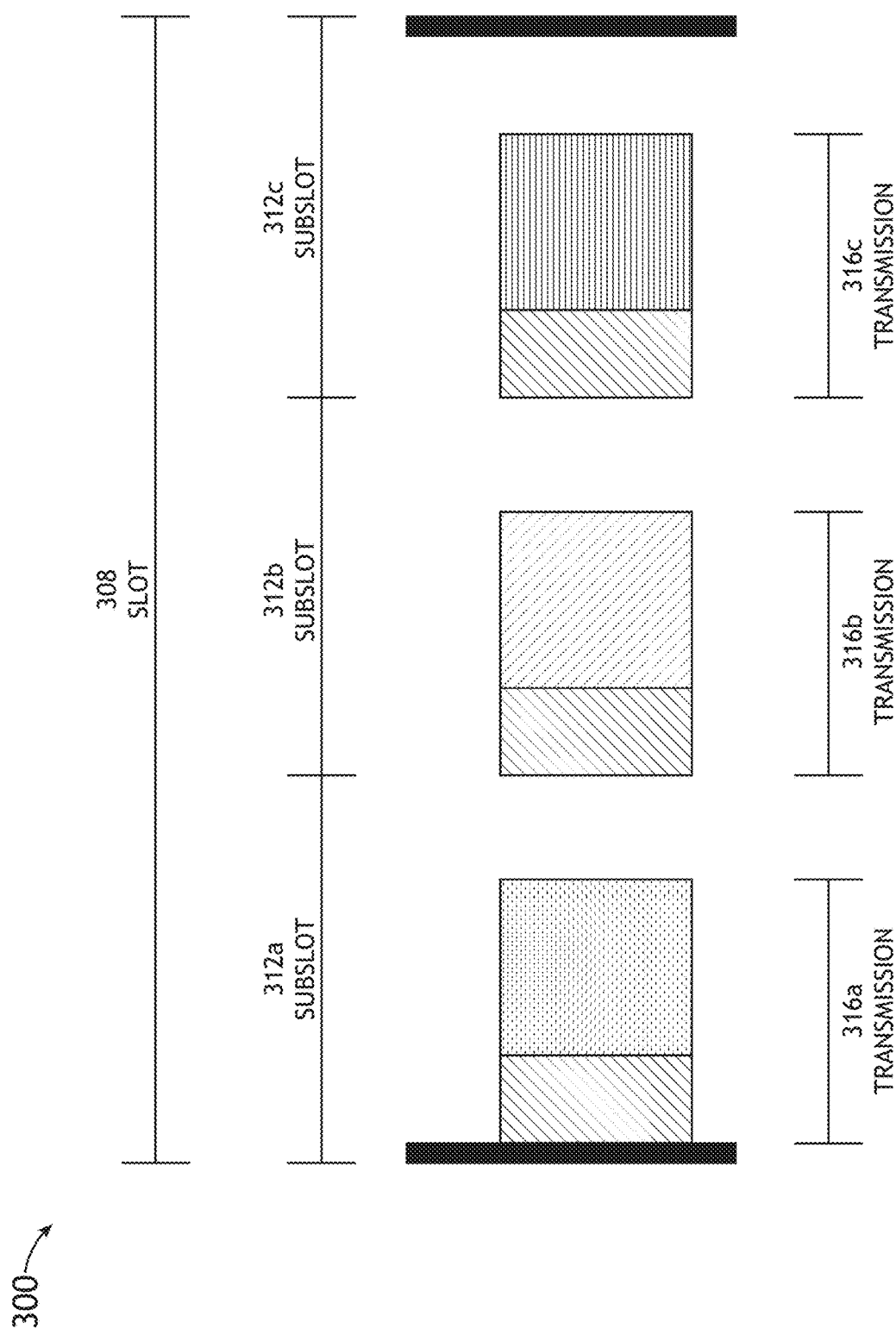
FIG. 3A is a diagram illustrating the organization of a slot and subslots, in relation to a transmission, in accordance with one or more embodiments of the disclosure.
Figure 3B:
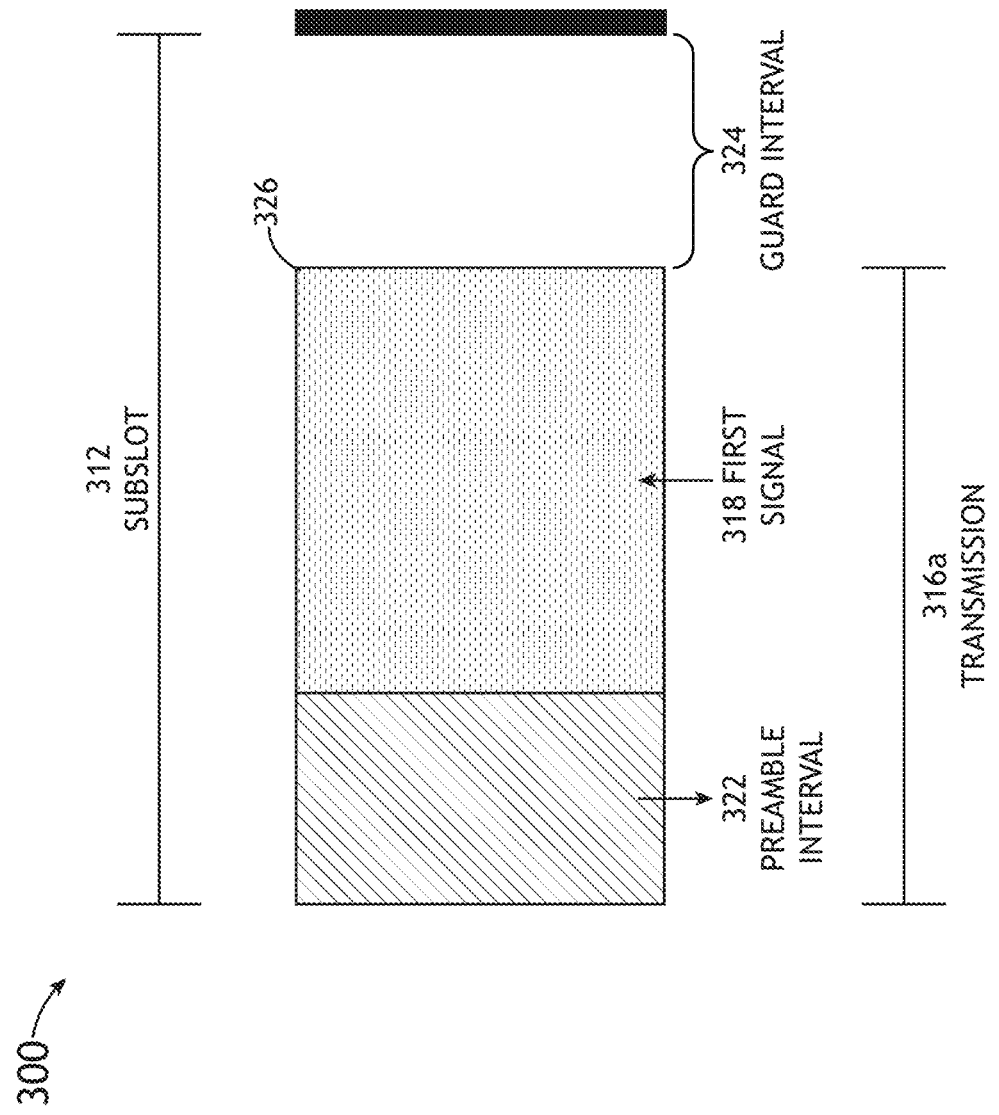
FIG. 3B is a diagram illustrating the organization of a transmission in relation to a subslot, in accordance with one or more embodiments of the disclosure.

An initial transmission 316 transmitting a first signal 318 within a traditional single subslot 312 is demonstrated in FIG. 3B, in accordance with one or more embodiments of the disclosure. In this traditional subslot scheme, the initial transmission 316a includes a first signal 318 (e.g., transmitted during a block of transmission time within the subslot 312 which includes the message to be sent. The initial transmission 316a further includes a preamble (e.g., transmitted during a preamble interval 322) usually organized at the beginning of the subslot 312. Data transmitted during the preamble interval 322 includes timing and synchronizing information that ensures that the TADA receiver can ascertain the presence of the signal and the timing of the first signal 318 as it is transmitted and/or retransmitted at specific times. The traditional subslot 312 further makes use of a guard interval 324 (e.g., or guard time) after the end of the first signal that prevents the transmission 216 a-c from overlapping and allows time for receivers to detect the data contained in the first signal and make a decision (e.g., at a decision point 326) on whether to continue to receive or to retransmit the first signal 318 or algorithmically related signal (e.g., based on the first signal 318 or the message) in the next subslot. Because the guard interval 324 is disposed on the end of the subslot 312, any transmissions occurring in the guard interval 324 arrive too late to affect the decision-making that the receiver 205 will do in the next subslot 312. In contrast, the first signal 318 may be used by the node 100a-g in determining if the transmitter 204 of the node can retransmit the first signal 318 in the next subslot 312b. For example, once the first signal 318 is received by the receiver 205, the node 100a-g may decide 1) whether the first signal 318 has been correctly received, and 2) whether the first signal 318 can be retransmitted into a future subslot 312.

In embodiments, the initial transmission 316 may include additional signals 320 including at least one of a retransmitted portion of the first signal 218 or an algorithmically related signal (e.g., based on the first signal 318 or the message) as shown in FIG. 3C, in accordance with one or more embodiments of the disclosure. For example, the additional signals 320 may be transmitted after the first signal 318 is transmitted. For instance, the additional signals may be transmitted at the end, to the end, or near the end, of the subslot 312 (e.g., essentially replacing the guard interval 324 of a traditional subslot 312). The additional signals 320 are used by the receiver 205 of the node 100a-g to improve the likelihood of correctly detecting the information in the next subslot. For example, additional signals 320 transmitted by a node 100a-g in the first subslot 312a, may be combined with to the first signal 318 during the period of the second subslot. Once combined, processors 244 within the node 100a-g determine whether the message conveyed by the first signal 318 has been correctly received and should be retransmitted, the node 100a-g can retransmit the first signal 318 or an algorithmically related first signal in a third or later subslot 312c-n. The steps of receiving additional signals 320, combining the signals, and determining that the message has been received are time sensitive. For example, a receiving node 100 will receive additional signals 320 up to the decision point 326, at which time the received signals will need to be combined and processed so that a determination can be made on whether to prepare to retransmit the message in the next subslot 312.

It should be understood that the combining of signals in this disclosure may refer to either the combination of signals directly (e.g., the combination of a first signal 318 and with additional signals 320 that contain a retransmitted portion of the first signal 318) or to the combination of information derived from the signals. For example, when the first signal and additional signals are comprised of modulated bits, the bits may be detected and the combining step may occur after the detection and be undertaken with bits, rather than signal. The bits may also be represented as soft-decisions and the combination may employ soft decisions. A transmission may also include error detection and correction code. For example, if an error detection and correction code is transmitted and received, the received signal may be combined and detected (e.g., as bits or soft decisions) prior to running the error correction and detection code. In another example, the error correction and detection decoder may operate with bits that are output from independent detections of each of the first signals and additional signals. For clarity, in the latter case, there is no constraint that the modulated bits in the first signal and any retransmitted first signal, or the modulated bits in the additional signal or any retransmitted additional signal, need to be the same as they may be different bits derived from parity equations from a low-rate error detection and correction code operating on the same message.

The combining of signals may be performed by various circuitry within the controller 240 (e.g., via the one or more processors 244), or other node componentry. For example, the combining of signals may be performed by an equalizer integrated within, or separated from, the one or more processors 244. Once the equalizer has combined the signal, the node may then determine whether the message has been correctly received based on the combined signal, and the combined signal may be retransmitted in a subsequent subslot 312 based on whether the determination of a correctly received combined signal comes before or after a specific decision point 326.

The retransmitted portion of the first signal 318 included within the additional signal 320 may include any portion, or any size of portion, of the first signal 318. For example, the retransmitted portion of the first signal may include roughly the first third of the first signal 318. The algorithmically related signal, based on the first signal 318 or the message, may include any data related to the first signal including but not limited to error correcting code, as detailed herein.

The additional signal 320 may be transmitted by the transmitter 204 after a short delay after transmitting the first signal 318 (e.g., the subslot 312 retaining a small guard interval 324), or may be transmitted without break from the transmitter 204 (e.g., the transmitter 204 can be keyed-on the whole time during the transmission of the additional signal 320) Transmitting to the end of a subslot 312 is possible for all subslots 312 within the slot 308, however in some cases, transmission may not occur to the end of the last subslot 312c, as the guard interval 324 may be required between slots 308=.

Figure 3D:
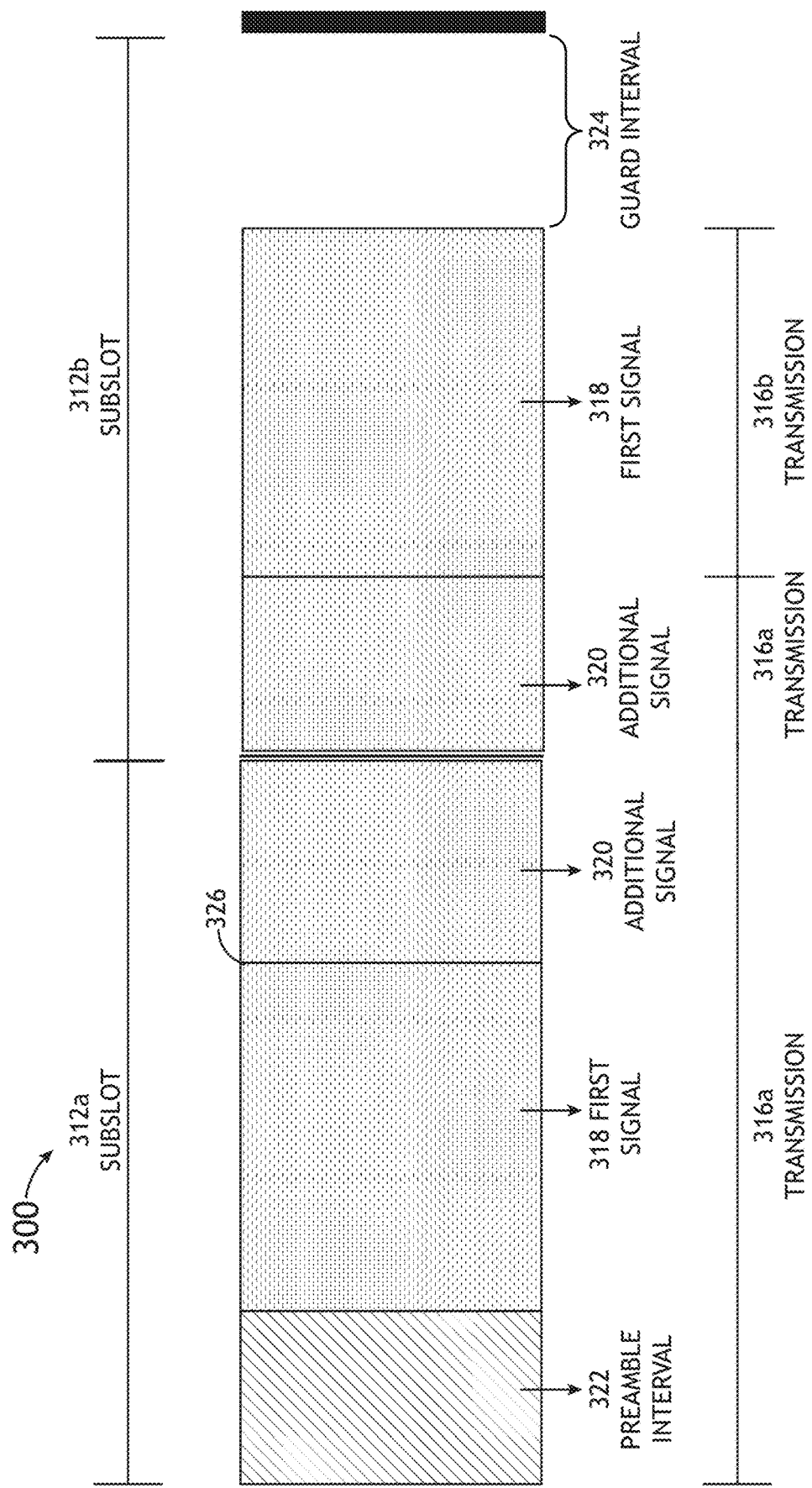
FIG. 3D is a diagram illustrating the organization of a transmission in relation to a subslot, with a transmission from the previous subslot extending into the beginning of the subslot, in accordance with one or more embodiments of the disclosure.
Figure 3E:
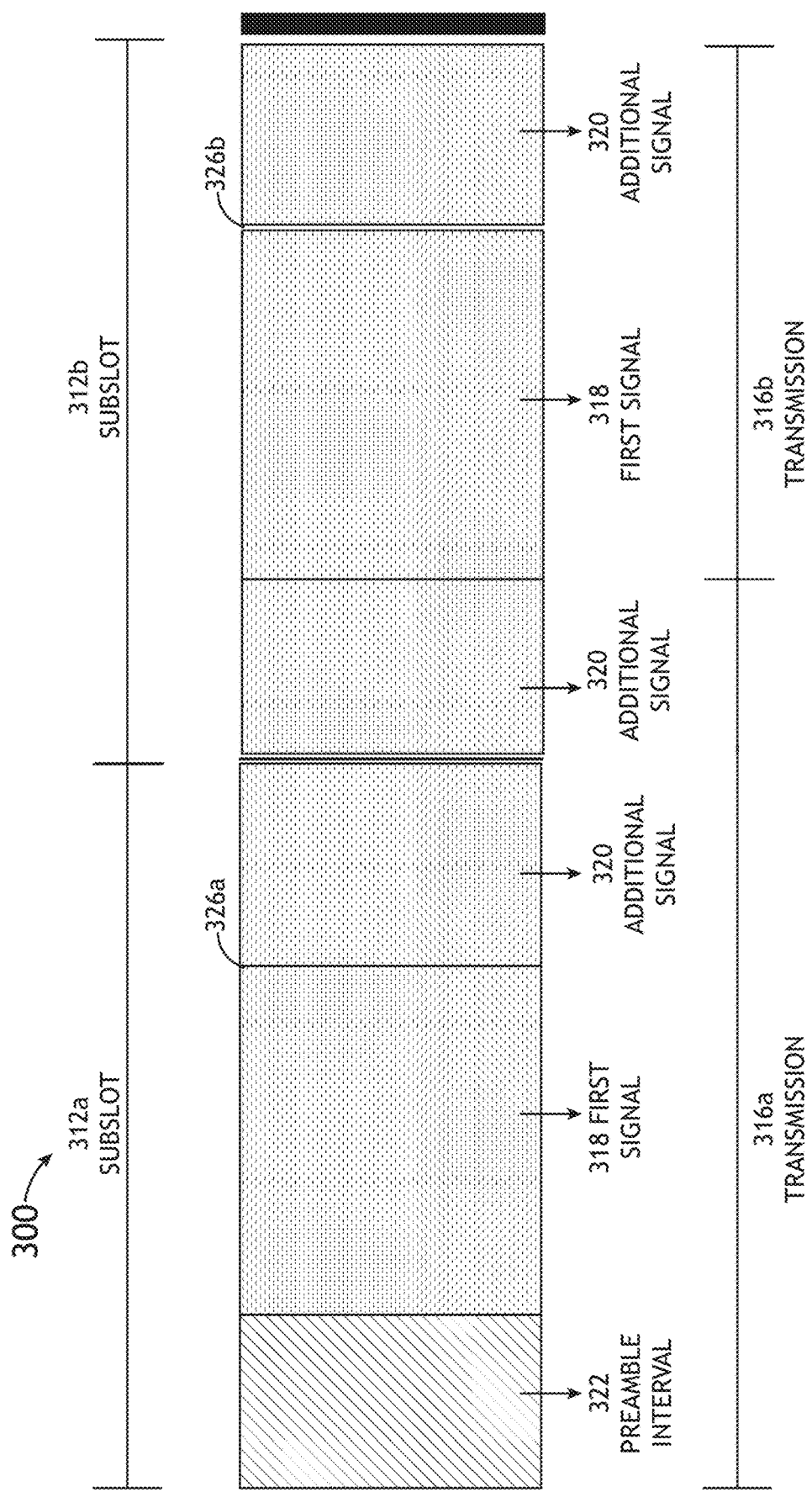
FIG. 3E is a diagram illustrating the organization of a transmission in relation to a subslot, with the transmission extending to the end of the subslot and with a transmission from the previous subslot extending into the beginning of the subslot, in accordance with one or more embodiments of the disclosure.

FIG. 3D demonstrates a subslot 312b, configured with a transmission 316a that continues from subslot 312a into subslot 312b, and a transmission 316b that initiates and ends in subslot 312b, in accordance with one or more embodiments of the disclosure. The transmission 316 includes an extended additional signal 320 that is transmitted through the boundary of the two subslots. The preamble interval 322 is reduced and/or omitted from subslot 312b. As above, the additional signal 320 may be transmitted by the transmitter 204 after a short delay after transmitting the first signal 318 (e.g., the subslot 312 retaining a small guard interval 324 or preamble interval 322), or may be transmitted without break from the transmitter 204. Transmitting a transmission 316a into the beginning of a subsequent subslot 312b is possible for all subslots 312 within the slot 308 with the exception of the first subslot 312a, as an initial preamble interval 322 is required at the beginning of any transmission, either by an originating node, or a retransmitting node. After the first signal 318 of the second transmission 316 is transmitted within the second subslot 312b, the end of the subslot may be reserved for a guard interval 342 (e.g., as shown in FIG. 3D), or may have additional signal 320 transmitted as shown in FIG. 3E. Due to a constraint that the signal from two transmitters 204 transmitting at or very near the same time must be the same, nodes 100a-g that continue to transmit additional signal 320 must ensure that the same signal is transmitted by all with the additional signal 320 essentially an extension of the first signal, that replaces the guard interval 324 and/or preamble interval 322 and may serve to increase the likelihood of the first signal 318 being correctly detected by another node 100a-g in a subsequent slot.

Figure 3F:
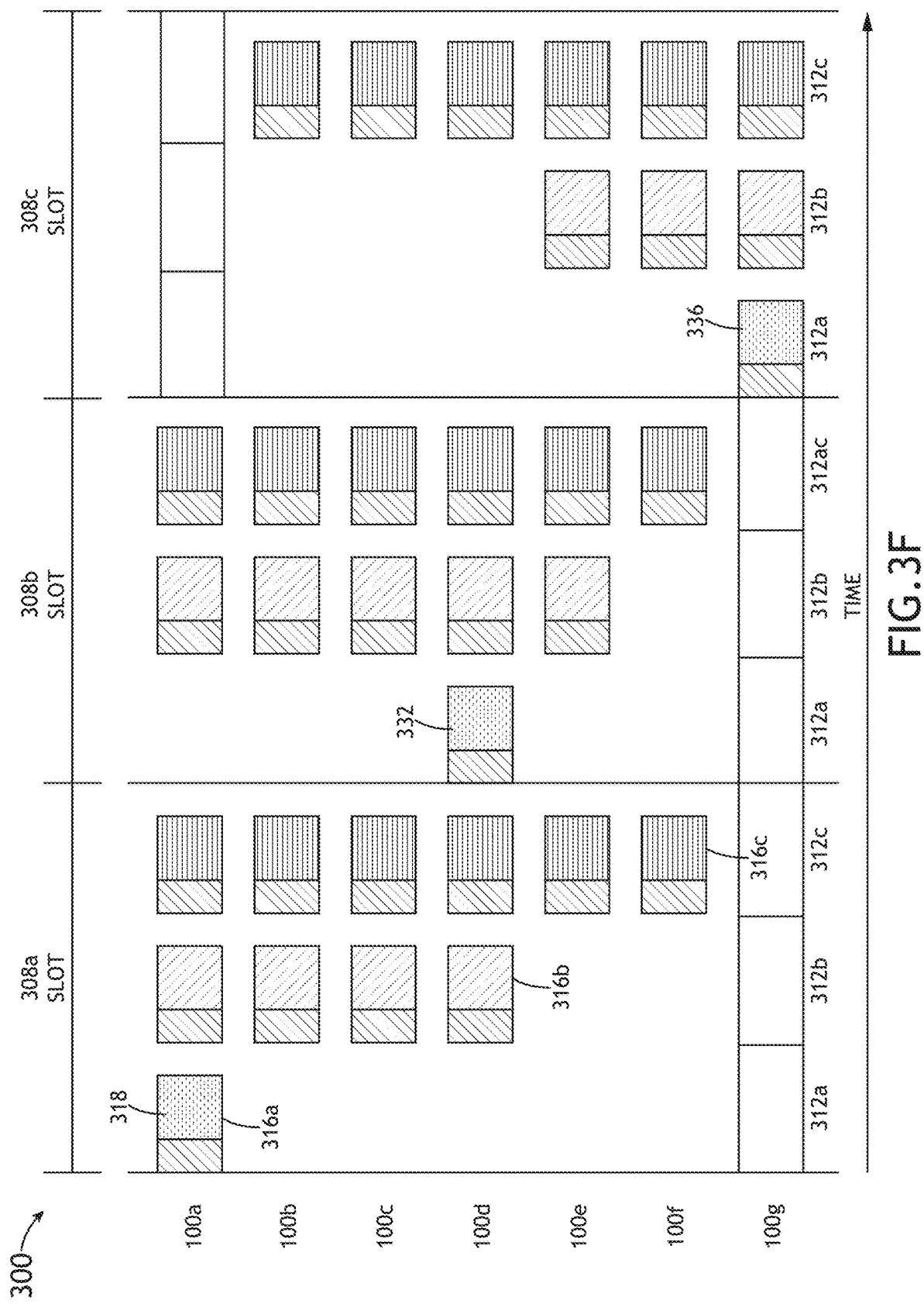
FIG. 3F is a diagram of a transmission profile of multiple nodes of a network, in accordance with one or more embodiments of the disclosure.

A traditional transmission profile 328 of the TDMA scheme 300 showing three slots 308a-c, each with three subslots 312a-c, is shown in FIG. 3F in accordance with one or more embodiments of the disclosure. Each node 100a-g is capable of originating and relaying a transmission 316a-c, and each slot 308a-c is used to send a signal (e.g., the first signal 318 in the first slot 308a, a second signal 332 in the second slot 308b, and a third signal 336 in the third slot 308c) that is transmitted or retransmitted via the three subslots 312a-c, which act to ensure that each targeted nodes 308a-g have correctly received the first signal 318, the second signal 332, and the third signal 336. For example, In the first subslot 312a of the first slot 308a, a node 100a transmits the transmission 316a for the first time (e.g., the initial transmission). The transmission 316a is received by three nodes 100b-d and retransmitted (e.g., transmission 316b) in the second subslot 312b of the first slot 308a. The node 100a may also retransmit the transmission 316b as well.

It is noted that the first signal 318, once transmitted by the initiating node 100a, retains the status as the first signal 318 after retransmission through another node 100a-g within the same slot 308a, as the message encoded by the first signal 318a does not change. It is also noted that a first signal that may be encoded (e.g., to produce an algorithmically related signal) by a node 100a-e and transmitted and may still referred to as a first signal 318 or may be referred to as an algorithmically related signal (i.e., the first signal retains the same message, whether or not a retransmission of the first signal has been encoded). The algorithmically related signal may also include, or may only include, error correcting code that corresponds to the first signal. For example, in slot 308a, the first signal 318 and all retransmitted signals and algorithmically related signals in slot 308a may contain the same message. In the interest of clarity, a subsequent signal transmitted by an initiating node that contains a message different that the first signal is referred to as a second signal 332 or third signal 336.

The original transmission and subsequent retransmissions shown in slot 308a is similarly performed in slot 308b, 308c, and may include messages and signals derived from those messages that are identical to, or different than, first signals 318 transmitted in slot 308a. For example, In the first subslot 312a of the second slot 308b, node 100d is acting as the originating node and transmits the transmission 316a, in the first subslot 312a of slot 308b. Nodes 100a-e receive the transmission and transmit or retransmit into the second subslot 312b of the second slot 308b. Nodes 100a-f receive the transmission 316b and transmit or retransmit into the third subslot 312c of the second slot. In slot 308c, node 100g initiates the transmission 316a in subslot 312a, which is then transmitted and retransmitted in subslots 312b-c. Retransmitting transmissions 316a-c into subslots 312a-c creates time-diverse signals that increase the ability of a single node 100 to competently receive the transmission 316a-c.

Figure 4A:
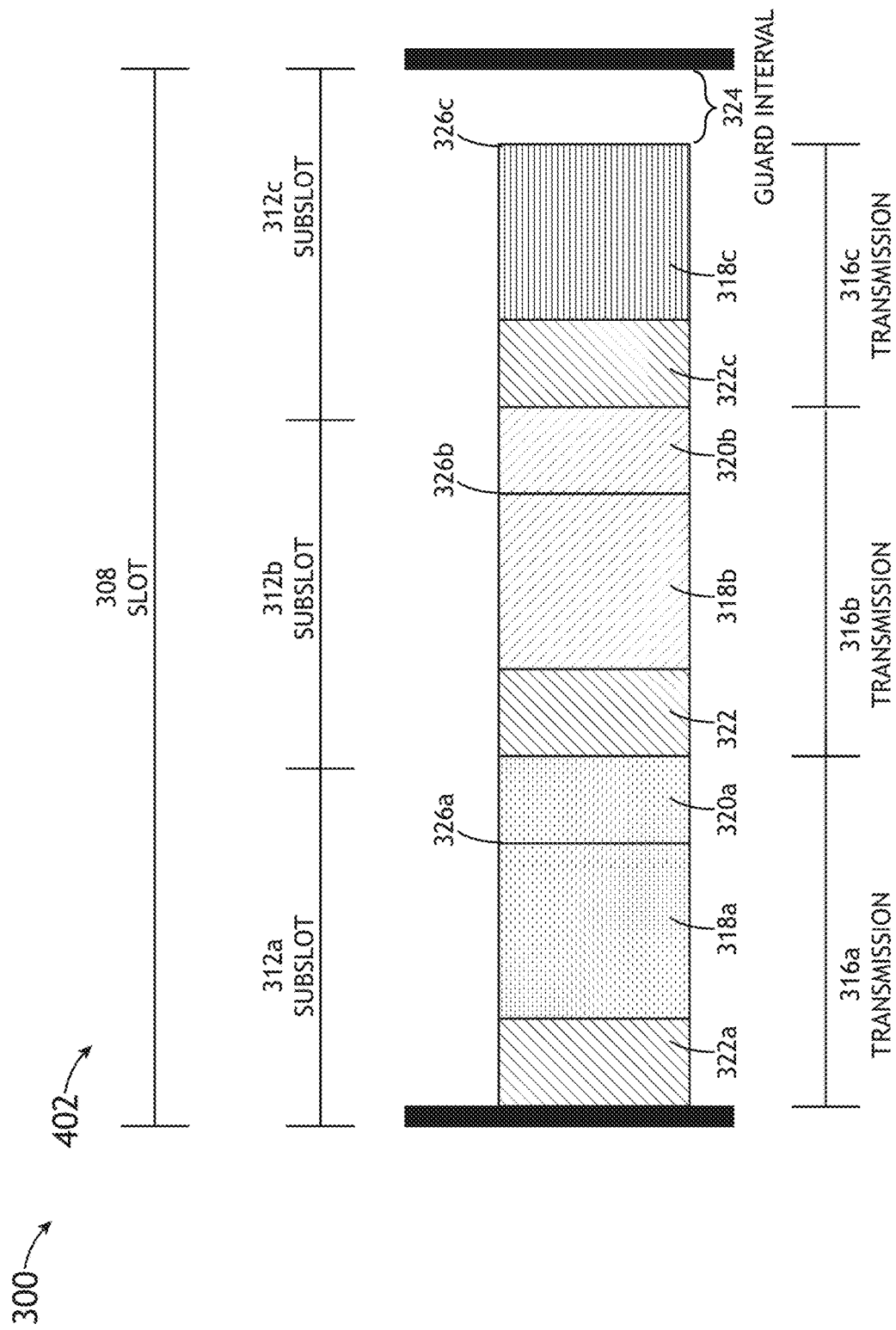
FIG. 4A is a diagram illustrating the organization of a slot, and subslot, in relation to a transmission, in accordance with one or more embodiments of the disclosure.

FIG. 4A discloses a transmission profile 402 for the TDMA scheme 300 with transmissions 316a-b that extend to the end of the subslot 312a-b as shown in FIG. 3C, in accordance with one or more embodiments of the disclosure. The subslots 312a-c include first signals 318a-c which may or may not be the same signal, but all convey the same message (e.g., first signal 318c is a retransmission of the message and algorithmically related to first signal 318b, which is a retransmission of the message and algorithmically related to first signal 318a), additional signals 320a-b transmitted in the first two subslots 312a-b, with subslot 312c retaining a guard interval.

Guard intervals 324 represents a substantial overhead relative to the portion of the subslot 312 dedicated to transmitting data (e.g., the first signal 318). The additional signals 320a-b containing the retransmitted portions of the first signal 318 or an algorithmically related signal, which may include error correction code (e.g., parity bits) permit each node 100a-e to perform a quality check on each transmission 316a-c as carrying additional data or parity bits in these intervals may improve the likelihood of success in subsequent decoding cycles. For example, and in embodiments, cyclic redundancy check (CRC) code is included within the first signal 318a-c, for which the node 100 receiving the first signal 318 then makes a decision based on the CRC code whether the message has been received. If the CRC fails, the redundant additional signals transmitted in subsequent subslots 312 within the slot 308 will increase the likelihood of subsequent CRCs passing. Data for error checking may further include any type of data for any type of error correction or error correction schemes including but not limited to minimum distance coding, repetition codes, checksums, hash functions, and forward error correction and may include signal quality indications in the determination of whether errors are present.

Figure 4B:
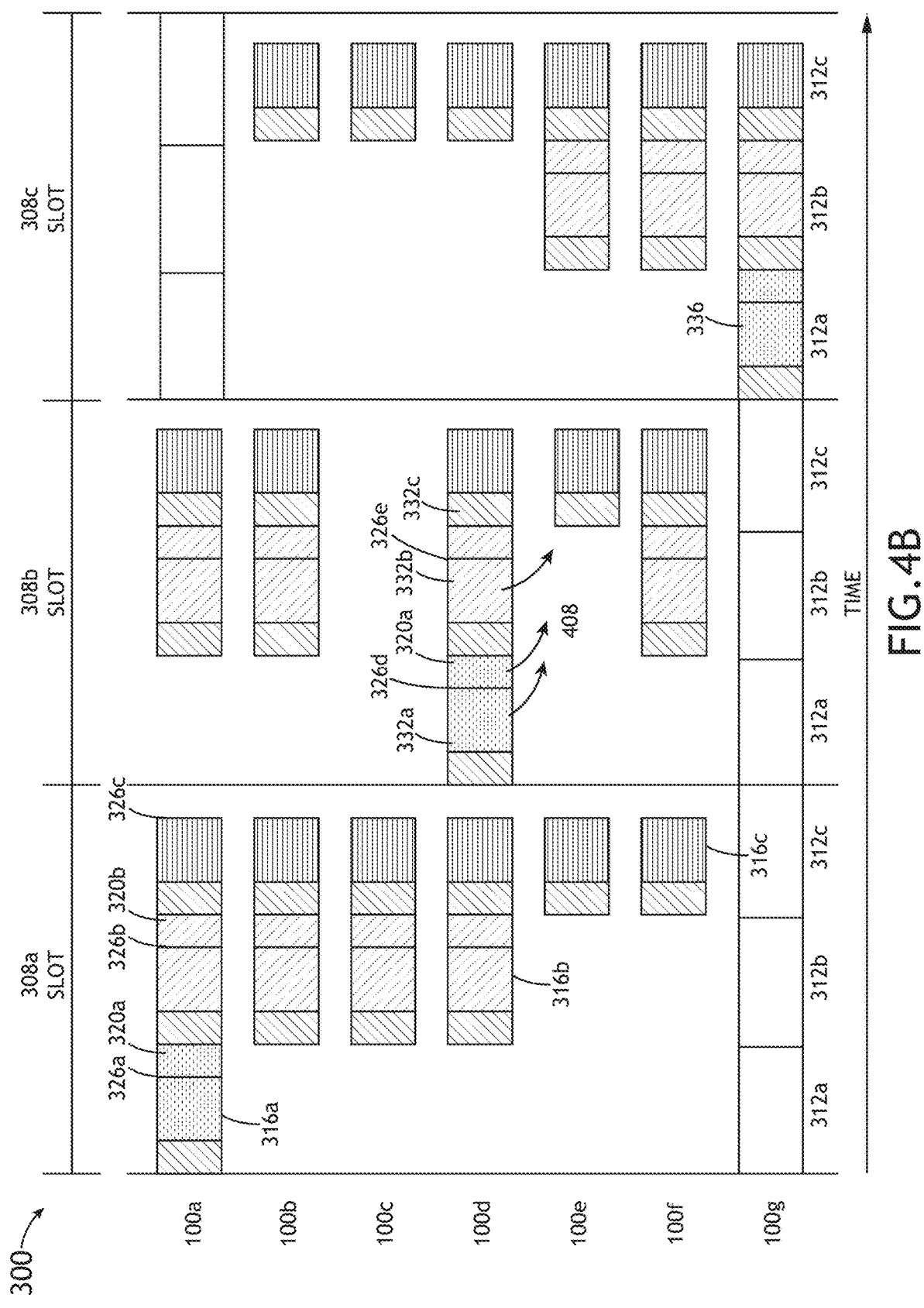
FIG. 4B is a diagram of a transmission profile of multiple nodes of a network, in accordance with one or more embodiments of the disclosure.

FIG. 4B demonstrates an expanded transmission profile 404 of a TDMA scheme 300 where transmissions 316a-b are transmitted as shown in FIG. 4A, in accordance with one or more embodiments of the disclosure. In each slot 308a-c, the first subslot 312a and the second subslot 312b transmit additional signal 320, while the last subslot may retain a guard interval 324. The data replacing the guard interval 324 in subslots 312a-b can substantially increase transmission efficiencies. For example, where a guard interval 324 occupies approximately half the duration in a subslot 312 as the original data carrying signal, 50% more data carrying signal becomes available, which may be used to reduce code rate and improve the likelihood of correct reception. This approach is valid for both equalized signals requiring positive signal-to-noise ratios for detection and for spread spectrum signals in negative signal-to-noise schemes.

As shown in FIG. 4A each subslot comprises a decision point 326a-c wherein a node 100 a-g must make a decision on whether the node 100 a-g has a valid reception of the first signal 318 and can retransmit the first signal 318 into a subsequent, or future, subslot 312. For example, if a node 100a-g decides that the received first signal 318 is valid (e.g., at decision point 326a), the node 100a-g may then transmit the first signal 318 in the subsequent subslot 312. In another example, if a node 100a decides at decision point 326a that the received first signal 318 not valid (e.g., containing errors), the node 100a may decide at decision point 326a not to retransmit the first signal 318 in the next subslot 312b and may instead continue to receive and use both the addition signal 320a and the next subslot 312b for gathering additional information to improve the detection of the first signal 318, wherein the node 1003 receives additional signal 320a from subslot 312a together with a retransmitted first signal 318b to perform the detection. The node 100a then combines the received first signals 318a and 318b with the additional signal 320a to make a decision at the next decision point 326b. If the node 100a-g determines after the combination of signals and analysis of the signals that the message conveyed by the first signal 318 has been correctly received, the node 100a-g may then decide (e.g., at the next decision point 326b) to transmit the first signal 318 at the next available subslot 312c. It should be understood that a node 100a-g receiving a first transmission 316a within a first subslot 312a of a slot 308 cannot combine the received signal with additional signal 320, as there is no previously transmitted additional signal 320 that can be combined with the received signal.

The use of previous first signals 318a and additional signals 320a to influence the reception of the first signal 318 by a downstream node 100 can be shown by the originating node 100d and relay node 100e transmitting the second signal 332 within slot 308b in FIG. 4B. For example, originating node 100d initially transmits a (first) second signal 332a that is not successfully detected by node 100e, and particularly node 100e cannot discern second signal 332a as valid at decision point 326d. For this reason, node 100e is silent during the second subslot 312b of the slot 308b. Instead, node 100e keeps listening for signal, and receives additional signal 320a and the (second) second signal 332b. This time, at or before decision point 326e, node 100e has combined the signals from the second signals 332a-b and the additional signals 320a (e.g., as indicated by arrows 408, has determined that the second signal received is valid, and transmits the second signal 332. In this manner, a node 100e not successfully receiving a signal in a first subslot 312a may be silent in the second subslot 312b, may combine data received in the first subslot 312a and the second subslot 312b, and may transmit a retransmission based on the combination of data received in the first subslot 312a and the second subslot 312b in the third subslot 312c. It should be understood that the first subslot 312a may be configured as the initial subslot 312(e.g., the first subslot 312 in the slot 308), or may be configured as the first subslot 312 that a retransmission is transmitted by a node 100. In this manner, the originating node may also be considered to be either the first transmitting node 100a in the slot 308, or as a node 100 that transmits a first signal 318 that is received by another slot 308.

In contrast to node 100e, node 100f is successful in receiving the second signal 332a in the first subslot 312a of the second slot 308b, as shown by node 100f retransmitting the second signal 332a as second signal 332b in subslot 312b. As discussed above, retransmission of the second signal 332a requires that the node make the decision to retransmit by decision point 326d. Node 100f then retransmits into subslot 312c the second signal 332c. In this example, both nodes 100e and nodes 100f have the same potential to receive the second signal 332a from node 100d. Although node 100e is not as successful as node 100f in immediately picking up the second signal 332a and retransmitting in subslot 312b, node 100e is capable of eventually retransmitting in subslot 312c due to the combining of received second signal 332b with additional signal 320a.

It should be understood that the first signal 318 and additional signal 320 transmitted at the same time or nearly the same time by nodes 100a-g within the network 104 must be common to each node. For example, if all nodes 100a-e are transmitting, then all nodes 100a-e must transmit the same first signal 318 and/or the same additional signal in the subsequent subslot. In another example, if all but one node 100a-f transmits a first signal 318, while a single node 100g, having not received a valid first signal 318 decides to use the additional signal 320 to evaluate and/or repair the first signal 318, then that signal node 100g may stay quiet (e.g., not transmit) during the subsequent subslot, while the other nodes 100a-f are transmitting, and on the next subslot after the subsequent subslot 312, may reinitiate transmitting the first signal 318. The commonality of transmitted signals also pertains to signals in the preamble for as long as additional signals 320 are not transmitted during the preamble interval 322. In some embodiments, the retransmission of the first signal 318 is coordinated between transmitting nodes 100. For example, the retransmission of the first signal 318 by retransmitting nodes 100 is coordinated in time and content (e.g., all nodes retransmit the same data at the same time).

Figure 5A:
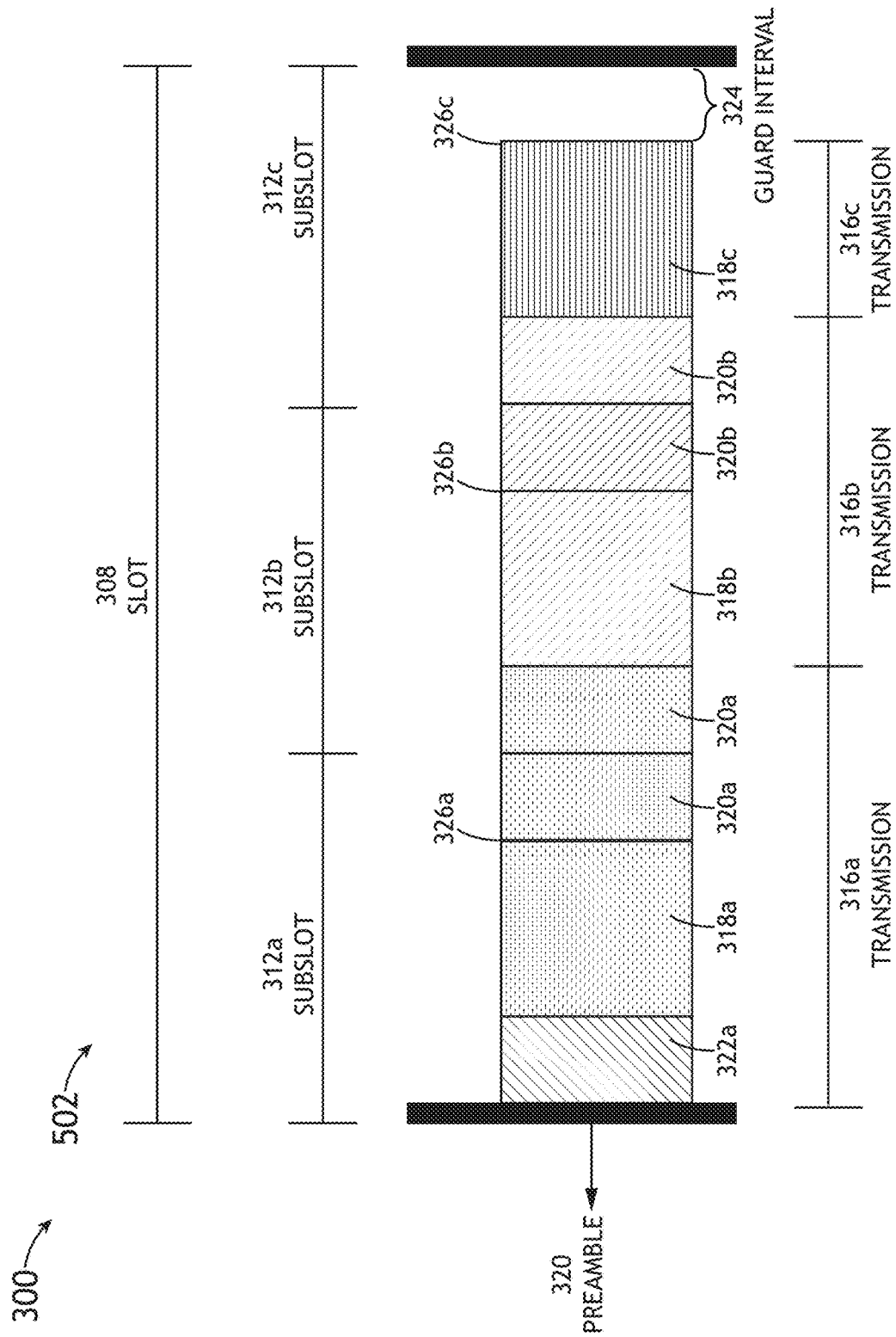
FIG. 5A is a diagram illustrating the organization of a frame, slot, and subslot, in relation to a transmission, in accordance with one or more embodiments of the disclosure.

FIG. 5A discloses a transmission profile 502 for the TDMA scheme 300 with transmissions 316a-b that extend through the end of the subslots 312a-b into the beginning of subslots b-c, as shown in FIG. 3D, in accordance with one or more embodiments of the disclosure. For example, additional signal 320a from the first transmission 316a extends from the end of the first subslot 312a into the beginning of the second subslot 312b, with the second subslot configured with a reduced or omitted preamble interval 322. In another example, additional signal 320b from the second transmission extends from the end of the second subslot 312b into the beginning of the third subslot 312c, with the third subslot configured with a reduced or omitted preamble. The first subslot 312a still retains a preamble. As with the reduction of the guard interval 324, the addition of additional signal 320 into the space normally given to the preamble interval 322 may also increase the performance of the transmission 316, with each node sending and receiving additional signals (e.g., retransmitted portions of the first signal or algorithmically related signals) that can be used to detect and/or repair invalid first signals 318.

Figure 5B:
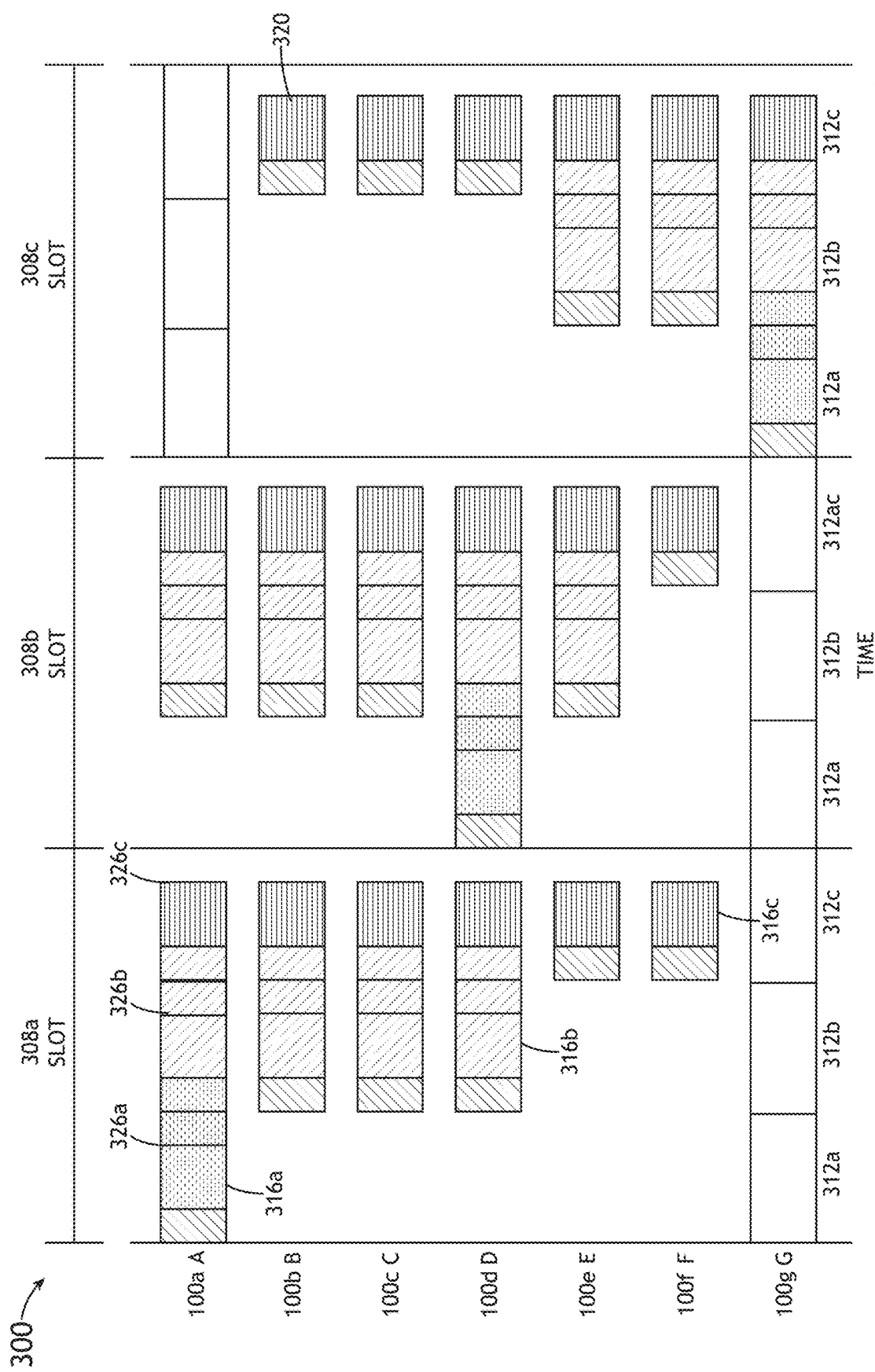
FIG. 5B is a diagram of a transmission profile of multiple nodes of a network, in accordance with one or more embodiments of the disclosure.

FIG. 5B demonstrates an expanded transmission profile 508 of a TDMA scheme 300 where transmissions 316a-b are transmitted as shown in FIG. 5A, in accordance with one or more embodiments of the disclosure. The preamble interval 322 of the subslots 312b-c of the transmission profile 508 are reduced or omitted for nodes that are continuing to transmit the same message from a previous subslot, as well the guard intervals 324 of subslots 312a-b, with additional signal 320 transmitted during these times in many of the nodes 100a-g. In this instance, nodes transmitting for the first time will not be sending the same signal as nodes that have transmitted in a previous subslot and are continuing to transmit during the interval that new transmitters begin a transmission with a preamble. As described above, the reduced/omitted preamble interval 322 and/or guard interval can substantially increase transmission efficiencies, as the preamble interval 322 may represent a substantial overhead relative to the first signal 318. For example, when a signal that can be detected in the presence of strong noise and interferers is used to transmit data (e.g., such as a Walsh coded modulation detected with a rake receiver) better performance can be obtained by having each node 100a-g that is in possession of the information being sent in the current subslot 312 continue to transmit during the period normally reserved for the guard interval 324 and preamble interval 322. For example, and as indicated in FIG. 5A, where the additional signal 320 occupies the same proportion of the subslot 312 as the first signal 318, the use of the preamble interval 322 and guard interval 324 for transmitting data has the effect of doubling the data carrying signal available in all subslots 312 after the initial transmission, thereby improving the likelihood of the first signal 318 being received correctly.

It should be noted for systems running the TDMA scheme as shown in FIG. 5A-B, if only the nodes 100 transmitting in a subsequent subslot 312 will be the same nodes 100 transmitting in the next subslot 312 after the subsequent subslot 312, then all transmitting nodes will transmit the same additional signal 320 during the preamble interval 322 of the subsequent subslot. However, if a node 100 begins transmitting in the next subslot after the subsequent subslot 312 (e.g., that was not transmitting in the subsequent subslot 312) that node 100 will transmit a preamble in the preamble interval 322, as all nodes 100 initiating a transmission are expected to transmit a preamble. This would indicate that a preamble interval 322 may include both nodes 100 transmitting additional signal 320 and nodes 100 transmitting preamble data at the same time. However, and as discussed below, the simultaneous transmission of differing signals may not be problematic.

As noted herein, a node 100a-g that had been synchronized on the initial transmission 316 (e.g., at the beginning of subslot 312a) can continue detecting data from that transmission as it continues into the second subslot 312b.

Additional retransmitting devices using the same spreading code for that data, for which the transmissions 316 are synchronized to within the multipath delay spread capability of the receiver, can be detected by the receiver, with additional tines added to the rake receiver to take advantage of the additional multipath signals. For example, nodes 100a-g may include a preamble in their first retransmission, employing a spreading code other than the code used by the data, which facilitates detection and synchronization by nodes 100 that did not receive the initial transmission 316a. For nodes 100 already synchronized, the preamble interval 322 encoded with a different spreading code would effectively be an additional source of noise in the rake receiver. Unless the preamble signal is substantially stronger than the signal that the receiver is synchronized to (e.g., depending on the spreading gain) the receiver 205 will continue to track and receive the ongoing transmission 316 in the presence of the preamble, and will benefit from additional signal components once the new signal transitions to a common signal and spreading code for data. In the case where the preamble interval 322 is received by an already synchronized node 100a-g is sufficiently strong as to disrupt the ongoing reception, it is likely that the data to follow would also likely be received at a high enough signal-to-noise ratio as to successfully complete the data transmission.

Figure 6:
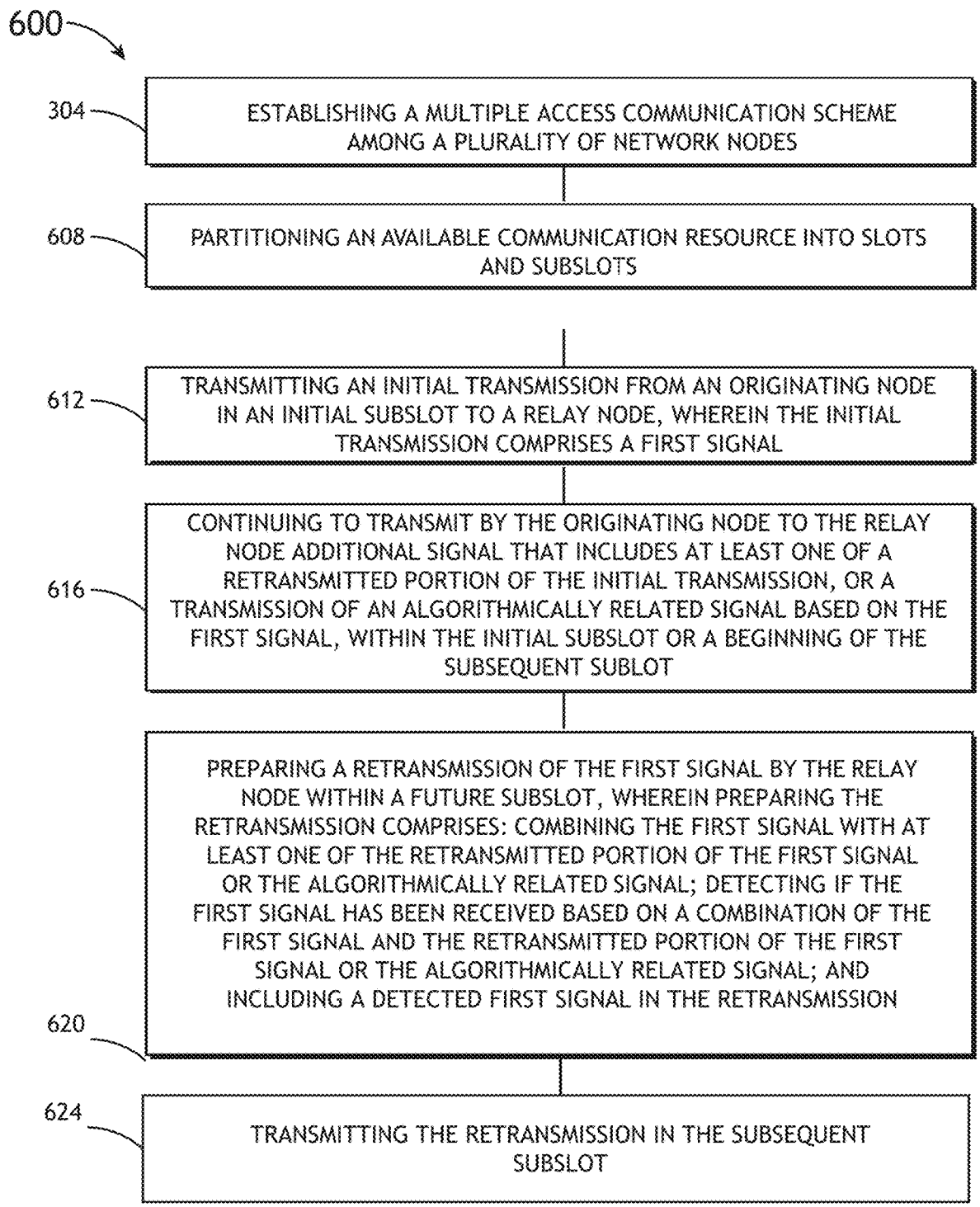
FIG. 6 is a flow diagram of a method for communicating between nodes in a network, in accordance with one or more embodiments of this disclosure.

FIG. 6 is a block diagram illustrating a method 600 for creating a multiple access communication scheme that utilizes additional signal 320 for increasing the robustness of transmitting a first signal 318, in accordance with one or more embodiments of the disclosure. The method 600 may be utilized during any network communication event and such as in high signal-to-noise environments, including during adversarial jamming episodes or the presence of other interfering signals.

In some embodiments, the method 600 includes a step 604 of establishing a multiple access communication scheme (e.g., a TDMA scheme 300) among the plurality of network nodes 100a-g. For example, the network 104 may be created from a plurality of nodes 100a-g capable of receiving a diversity signal as described herein.

In some embodiments, the method 600 further includes a step 608 of partitioning an available communication resource into slots 308 and subslots 312. For example, the communication resource (e.g., time) may be organized similarly to the transmission profiles 328, 402, 502 as described herein, with slots 308, and subslots 312. In particular, the transmission profile 328, 402, 502 may represent an avalanche relay scheme as described herein.

In some embodiments, the method 600 further includes a step 612 of transmitting an initial transmission 316a from an originating node 100a in an initial subslot 312a to a relay node 100b-g, wherein the initial transmission includes a first signal. For example, the initial transmission 316a may include a preamble transmitted in the preamble interval 322 followed by the first signal 318.

In some embodiments, the method 600 further includes a step 616 of continuing to transmit by the originating node to the relay node additional signal 320 that includes at least one of a retransmitted portion of the first signal, or a transmission of the algorithmically related signal based on the first signal, within the first subslot 312a (e.g., or initial subslot) or a beginning of the subsequent subslot 312b. This continuation of the transmission 316a may include transmitting at the end, to the end, or toward the end, of the initial subslot 312a. For example, the transmission 316a may transmit to the end of the subslot 312a, omitting the guard interval. The continuation of the transmission 316a that includes the additional signal 320 may also continue into to the subsequent subslot 312b. For example, the additional signal 320 extending into the subsequent subslot 312b may occupy the time usually taken up by the preamble, with the subsequent transmission 316b having the preamble reduced or omitted.

It should be understood that a transmission 316 may pass-through any number of subslots 312. For example, the transmission 316a may pass-though the initial subslot 312a to subslot 312c. In another example, the transmission 316 may pass through two subslots 312, may pass through three subslots 312, or pass through four or more subslots 312. The transmission 316 may also begin at any subslot 312 within the slot 308. For example, the transmission 316 may initiate at the second subslot 312b or at the third subslot 312c. Similarly, the originating node 100 may be configured as any node 100 that initiates a transmission 316 that is received by a relay node 100. For example, and as shown in FIG. 4B, the originating node may be the initial transmitting node in each slot 308a-c (e.g., nodes 100a, 100d, and 100g, respectively). The nodes may also include other nodes 100 that initiate transmission after the first subslot, and are capable of relaying the transmission 316 to another relay node 100 (e.g., nodes 100b, 100c, and 100d in slot 308a of FIG. 4B.). In this manner, a node 100 may both act as a relay node, receiving a transmission 316 from an originating node, and act as an originating node 100 transmitting to a relay node.

It should be understood that the configuration of the TDMA scheme 300 to include time for additional signal 320 that occupies time traditionally used for preamble intervals 322 and/or guard intervals 324 may be a default configuration that is set up when the TDMA scheme 300 is established. In some embodiments, the TDMA scheme 300 is set up as a traditional transmission profile 328, and then changes to reduced or omitted preamble intervals 322 and/or guard intervals 324. For example, the TDMA scheme 300 may be altered to have both omitted preamble intervals 322 and guard intervals 322 in the middle subslots (e.g., not including the first subslot or last subslot), allowing the transmitter 204 to remain keyed-on for long periods. The setup and changing of transmission profiles may be performed locally or globally via the one or more nodes 100a-g, and may involve node componentry including but not limited to the controller 240.

In some embodiments, the method 600 includes a step 620 of preparing a retransmission (e.g., transmission 316b) of the first signal 318 by the relay node 100b-g within a future subslot 312b, wherein preparing the retransmission comprises combining the first signal 318 with at least one of the retransmitted portion of the first signal 318 or the algorithmically related signal (e.g., additional signal 320), detecting if the first signal has been received based on the combination of the first signal and the retransmitted portion of the first signal or the algorithmically related signal; and including a signal conveying the same message as the detected first signal in the retransmission. The combination of the first signal 318 with the retransmitted portion of the first signal 318 or the algorithmically related signal (e.g., which may contain error correcting code) may be performed by the controller 240 or other processing componentry within the node. If the comparison or combination indicates that a valid received first signal 318 has been detected, the node 100a, having received the initial transmission 316a will include the signal conveying the same message as the detected first signal in the retransmission, and transmit this into a future subslot 312 (e.g., the next available subslot 312) as noted in step 624 of the method 600.

The decision of which subslot 312 the receiving node 100 is to retransmit the first signal 318 depends on the ability of the node 100 to detect a valid first signal 318 and/or repair an invalid reception of a first signal 318. For example, and as shown in FIG. 4B, if the node 100a receives a first signal 318 and confirms that the first signal 318 is valid early enough (e.g., at decision point 326a), the received first signal 318 may be transmitted in the next subslot 312b. However, if the received first signal 318 appears to be invalid, the node 100a will not transmit in the next subslot 312b and will instead use that time to carry out the comparison/error correction of the first signal 318 through use of the received additional signal 320. If the comparison/error correction is able to correctly detect the message quickly enough in the next subslot 312 (e.g., at or before the next decision point 326b, the node 100a will then transmit the first signal 318 in the next available subslot 312c.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A method comprising:
    establishing a multiple access communication scheme among a plurality of network nodes, wherein the multiple access communication scheme utilizes subslots;
    transmitting an initial transmission from an originating node or a retransmitting node in a first subslot to at least one relay node, wherein the initial transmission comprises a first signal that is sufficient to convey a message;
    continuing to transmit, by the originating node to the at least one relay node, additional signal comprising at least one of a retransmitted portion of the first signal, a transmission of an algorithmically related signal based on the first signal, or a transmission of the algorithmically related signal based on the message, within the first subslot or a beginning of a subsequent subslot, wherein the additional signal is transmitted by the originating node or the retransmitting node past a decision point used by the at least one relay node to determine whether to transmit a retransmission of the first signal to convey the message in the subsequent subslot or a next subsequent subslot;
    determining by the at least one relay node that it has received the message; and
    preparing the retransmission of the first signal, the algorithmically related signal based on the first signal, or the algorithmically related signal conveying the message by the at least one relay node within a future subslot based upon a determination at the decision point that the at least one relay node has received the message, wherein preparing the retransmission comprises:
        determining the first signal, the algorithmically related signal based on the first signal, or the algorithmically related signal based on the message, that is coordinated in content between the originating node and the at least one relay node transmitting the message; and
        transmitting the retransmission of the first signal, the algorithmically related signal based on the first signal, or the algorithmically related signal based on the message, in the future subslot, wherein the retransmission is coordinated in time between the at least one relay node transmitting the message.

2. The method of claim 1, wherein transmitting the first signal with the additional signal increases a likelihood of correct reception of the first signal by another node in the subsequent subslot.

3. The method of claim 2, wherein the algorithmically related signal based on the first signal or the algorithmically related signal based on the message, includes error correcting code.

4. The method of claim 1, wherein the retransmitted portion of the first signal is transmitted into the first subslot.

5. The method of claim 1, wherein the retransmitted portion of the first signal is transmitted into the beginning of the subsequent subslot.

6. The method of claim 1, wherein the algorithmically related signal based on the first signal or the algorithmically related signal based on the message, is transmitted into the first subslot.

7. The method of claim 1, wherein the algorithmically related signal is transmitted into the subsequent subslot.

8. The method of claim 1, wherein a section of the first subslot receiving the retransmitted portion of the first signal, the algorithmically related signal based on the first signal, or the algorithmically related signal based on the message, corresponds to a guard interval.

9. The method of claim 1, wherein a section of the subsequent subslot receiving the retransmitted portion of the first signal, the algorithmically related signal based on the first signal, or the algorithmically related signal based on the message, corresponds to a preamble interval.

10. The method of claim 1, wherein the plurality of network nodes is configured to perform an avalanche relay protocol.

11. The method of claim 1, further comprising partitioning an available communication resource into slots, and the subslots.

12. The method of claim 1, wherein the additional signal is transmitted by all transmitting nodes continuing to transmit during a preamble interval during which at least one node transmits a preamble.

13. The method of claim 1, wherein the retransmission of the first signal, the algorithmically related signal based on the first signal, or the algorithmically related signal based on the message further includes additional data that is transmitted past the decision point.

14. The method of claim 1, further comprising:
    preparing the retransmission of the first signal by the at least one relay node within the future subslot, based on the determination at the decision point that the at least one relay node has not received the message, wherein the at least one relay node does not retransmit the retransmission of the first signal in the subsequent subslot, wherein the at least one relay node retransmits the first signal conveying the message as the retransmission in the first subslot after a successful reception of the message prior to the decision point, wherein the retransmission of the first signal is based on data transmitted past the decision point by the originating node and/or retransmitting nodes, wherein preparing the retransmission comprises:

continuing to receive the additional signal until a next decision point;

combining the first signal with at least one of the retransmitted portion of the first signal, the algorithmically related signal based on the first signal, or the algorithmically related signal based on the message;

detecting if the message conveyed by the first signal has been correctly received based on a combination of the first signal and the retransmitted portion of the first signal, the algorithmically related signal based on the first signal, or the algorithmically related signal based on the message in prior subslots and up to the decision point; and generating the retransmission of the first signal conveying the message by the at least one relay node within the future subslot based upon the determination at the next decision point that the at least one relay node has received the message, wherein generating the retransmission comprises determining the first signal, the algorithmically related signal based on the first signal, or the algorithmically related signal based on the message, that is coordinated in content between all the originating nodes and all the at least one relay node transmitting the message; and transmitting the retransmission of the first signal, the algorithmically related signal based on the first signal, or the algorithmically related signal based on the message, in the future subslot, wherein the retransmission is coordinated in time between all the at least one relay node transmitting the message.

15. The method of claim 14, wherein the preparing the retransmission further comprises continuing to receive the additional signal until one or more subsequent decisions points after the next decision point.

16. A system comprising:
a plurality of network nodes, two or more network nodes comprising:
an antenna;
a transmitter;
a receiver;
one or more processors in data communication with the antenna; and
a memory with instructions stored upon, that when executed by the one or more processors, cause the one or more processors to:
establish a multiple access communication scheme among the plurality of network nodes, wherein the multiple access communication scheme utilizes subslots;
transmit an initial transmission from an originating node or a retransmitting node in a first subslot to at least one relay node, wherein the initial transmission comprises a first signal that is sufficient to convey a message;
continue to transmit, by the originating node to the at least one relay node, additional signal comprising at least one of a retransmitted portion of the first signal, a transmission of an algorithmically related signal based on the first signal or a transmission of the algorithmically related signal based on the message, within the first subslot or a beginning of a subsequent subslot, wherein the additional signal is transmitted by the originating node or the retransmitting node past a decision point used by the at least one relay node to determine whether to transmit a retransmission of the first signal to convey the message in the subsequent subslot;

determine by the at least one relay node that the at least one relay node has received the message;

prepare the retransmission of the first signal conveying the message by the at least one relay node within a future subslot based upon a determination at the decision point that the at least one relay node has received the message, wherein preparing the retransmission comprises determining the first signal, the algorithmically related signal based on the first signal, or the algorithmically related signal based on the message, that is coordinated in content between all the originating nodes and all the at least one relay nodes transmitting the message; and transmit the retransmission of the first signal, the algorithmically related signal based on the first signal, or the algorithmically related signal based on the message, in the future subslot, wherein the retransmission is coordinated in time between all the at least one relay nodes transmitting the message.

17. The system of claim 16, wherein a combination of the first signal with the retransmitted portion of the first signal, the algorithmically related signal based on the first signal, or the algorithmically related signal based on the message increases a likelihood of a reception of the first signal by another node.

18. The system of claim 16, the instructions further causing the one or more processors to:

prepare the retransmission of the first signal by the at least one relay node within the future subslot, based on the determination at the decision point that the at least one relay node has not received the message, wherein the at least one relay node does not retransmit the retransmission of the first signal in the subsequent subslot, wherein the at least one relay node retransmits the first signal conveying the message as the retransmission in the first subslot after a successful reception of the message prior to the decision point, wherein the retransmission is based on data transmitted past the decision point by the originating node and/or retransmitting nodes, wherein preparing the retransmission comprises:

continuing to receive the additional signal until a next decision point;

combining the first signal with at least one of the retransmitted portion of the first signal, the algorithmically related signal based on the first signal, or the algorithmically related signal based on the message, detecting if the message conveyed by the first signal has been correctly received based on a combination of the first signal and the retransmitted portion of the first signal, the algorithmically related signal based on the first signal, or the algorithmically related signal based on the message, in prior subslots and up to the decision point; and generating the retransmission of the first signal conveying the message by the at least one relay node within the future subslot based upon the determination at the next decision point that the at least one relay node has received the message, wherein generating the retransmission comprises determining the first signal, the algorithmically related signal based on the first signal, or the algorithmically related signal based on the message, that is coordinated in content between all originating nodes and all the at least one relay node transmitting the message; and transmit the retransmission of the first signal, the algorithmically related signal based on the first signal, or the algorithmically related signal based on the message, in the future subslot, wherein the retransmission is coordinated in time between all the at least one relay node transmitting the message.

19. A method comprising:

establishing a multiple access communication scheme among a plurality of network nodes, wherein the multiple access communication scheme utilizes subslots;

transmitting an initial transmission from an originating node or a retransmitting node in a first subslot to at least one relay node, wherein the initial transmission comprises a first signal that is sufficient to convey a message;

continuing to transmit, by the originating node to the at least one relay node, additional signal comprising at least one of a retransmitted portion of the first signal, a transmission of an algorithmically related signal based on the first signal, or the algorithmically related signal based on the message, within the first subslot or a beginning of a subsequent subslot, wherein the additional signal is transmitted by the originating node or the retransmitting node past a decision point used by the at least one relay node to determine whether to transmit a retransmission of the first signal to convey the message in the subsequent subslot;

determining by the at least one relay node that the at least one relay node has received the message;

preparing the retransmission of the first signal by the at least one relay node within a future subslot, based on a determination at the decision point that the at least one relay node has not received the message, wherein the at least one relay node does not retransmit the retransmission of the first signal in the subsequent subslot, wherein the at least one relay node retransmits the first signal conveying the message as the retransmission in the first subslot after a successful reception of the message prior to the decision point, wherein the retransmission of the first signal is based on data transmitted past the decision point by the originating node and/or retransmitting nodes, wherein preparing the retransmission of the first signal comprises:

continuing to receive the additional signal until a next decision point;

combining the first signal with at least one of the retransmitted portion of the first signal, the algorithmically related signal based on the first signal, or the algorithmically related signal based on the message, detecting if the message conveyed by the first signal has been correctly received based on a combination of the first signal and the retransmitted portion of the first signal, the algorithmically related signal based on the first signal, or the algorithmically related signal based on the message, in prior subslots and up to the decision point; and generating the retransmission of the first signal conveying the message by the at least one relay node within the future subslot based upon the determination at the next decision point that the at least one relay node has received the message, wherein generating the retransmission of the first signal comprises determining the first signal, the algorithmically related signal based on the first signal, or the algorithmically related signal based on the message, that is coordinated in content between the originating node and the at least one relay node transmitting the message; and transmitting the retransmission of the first signal, the algorithmically related signal based on the first signal, of the algorithmically related signal based on the message, in the future subslot, wherein the retransmission is coordinated in time between all the at least one relay node transmitting the message.

20. The method of claim 19, wherein nodes transmitting in the first subslot transmits the additional signal in a preamble interval in the subsequent subslot, wherein at least one node that does not transmit in the subsequent subslot transmits a preamble in a preamble interval of a next subslot after the subsequent subslot and retransmits the first signal in the next subslot after the subsequent subslot.

\* \* \* \* \*